(12) United States Patent
Hanaoka et al.

(10) Patent No.: US 11,182,508 B1
(45) Date of Patent: Nov. 23, 2021

(54) ENHANCED VERSION RETENTION SYSTEMS AND METHODS

(71) Applicant: Polyverse Corporation, Kirkland, WA (US)

(72) Inventors: Christopher Hanaoka, Kirkland, WA (US); Ian Childress, Snoqualmie, WA (US); Alexander Gounares, Kirkland, WA (US); Archishmat S. Gore, Seattle, WA (US)

(73) Assignee: Polyverse Corporation, Kirkland, WA (US)

( * ) Notice: Subject to any disclaimer, the term of this patent is extended or adjusted under 35 U.S.C. 154(b) by 0 days.

(21) Appl. No.: 17/182,901

(22) Filed: Feb. 23, 2021

(51) Int. Cl.
*G06F 9/46* (2006.01)
*G06F 21/62* (2013.01)
*G06F 9/50* (2006.01)

(52) U.S. Cl.
CPC .......... *G06F 21/629* (2013.01); *G06F 9/5005* (2013.01)

(58) Field of Classification Search
CPC .............................. G06F 21/629; G06F 9/5005
See application file for complete search history.

(56) References Cited

U.S. PATENT DOCUMENTS

| | | | |
|---|---|---|---|
| 8,014,308 B2 | 9/2011 | Gates, III et al. |
| 8,312,273 B2 | 11/2012 | Nice et al. |
| 8,595,743 B2 | 11/2013 | Gounares et al. |
| 8,650,538 B2 | 2/2014 | Gounares |
| 8,656,135 B2 | 2/2014 | Gounares et al. |
| 8,656,378 B2 | 2/2014 | Gounares et al. |
| 8,694,574 B2 | 4/2014 | Gounares et al. |
| 8,775,437 B2 | 7/2014 | Weitz et al. |
| 8,849,968 B2 | 9/2014 | Hunt et al. |
| 8,909,546 B2 | 12/2014 | Horvitz et al. |
| 8,966,462 B2 | 2/2015 | Gounares et al. |
| 8,978,016 B2 | 3/2015 | Gataullin et al. |
| 9,021,445 B2 | 4/2015 | Gataullin et al. |
| 9,141,502 B2 | 9/2015 | Havemose |
| 9,286,042 B2 | 3/2016 | Gounares et al. |
| 9,292,415 B2 | 3/2016 | Seto et al. |
| 9,389,992 B2 | 7/2016 | Gataullin et al. |
| 9,417,859 B2 | 8/2016 | Gounares et al. |
| 9,465,721 B2 | 10/2016 | Garrett et al. |
| 9,483,590 B2 | 11/2016 | Kishore et al. |
| 9,558,362 B2 | 1/2017 | Subires Bedoya |
| 9,665,474 B2 | 5/2017 | Li et al. |
| 9,807,077 B2 | 10/2017 | Gounares |
| 9,923,793 B1 | 3/2018 | Gore |
| 10,033,604 B2 | 7/2018 | Maes et al. |
| 10,050,797 B2 | 8/2018 | Garrett et al. |
| 10,127,160 B2 | 11/2018 | Gounares et al. |
| 10,142,453 B2 | 11/2018 | Shuttleworth et al. |
| 10,339,837 B1 | 7/2019 | Gounares et al. |
| 10,356,155 B2 | 7/2019 | Tiwari et al. |

(Continued)

*Primary Examiner* — Gregory A Kessler

(74) *Attorney, Agent, or Firm* — Adam L. K. Philipp; Jonathan E. Olson; AEON Law, PLLC

(57) ABSTRACT

In some variants computing systems and methods are described in regard to protecting a first function in a first computing environment by proactively and selectively recording artifacts that support the function, thus allowing a computing environment to retrieve the older artifacts even after newer versions are implemented. Such proactive retention allows a restoration of or other reliable access to the function, even after attacks or other unnoticed changes to the function, optionally as a component of a software migration to a safer computing environment.

19 Claims, 16 Drawing Sheets

(56) References Cited

U.S. PATENT DOCUMENTS

| | | |
|---|---|---|
| 10,360,150 B2 | 7/2019 | Karthikesan |
| 10,382,424 B2 | 8/2019 | Kroehling et al. |
| 10,416,979 B2 | 9/2019 | Scrivano et al. |
| 10,701,213 B2 | 6/2020 | Dyer et al. |
| 2014/0274078 A1 | 9/2014 | Hyslop et al. |
| 2015/0094046 A1 | 4/2015 | Jung et al. |

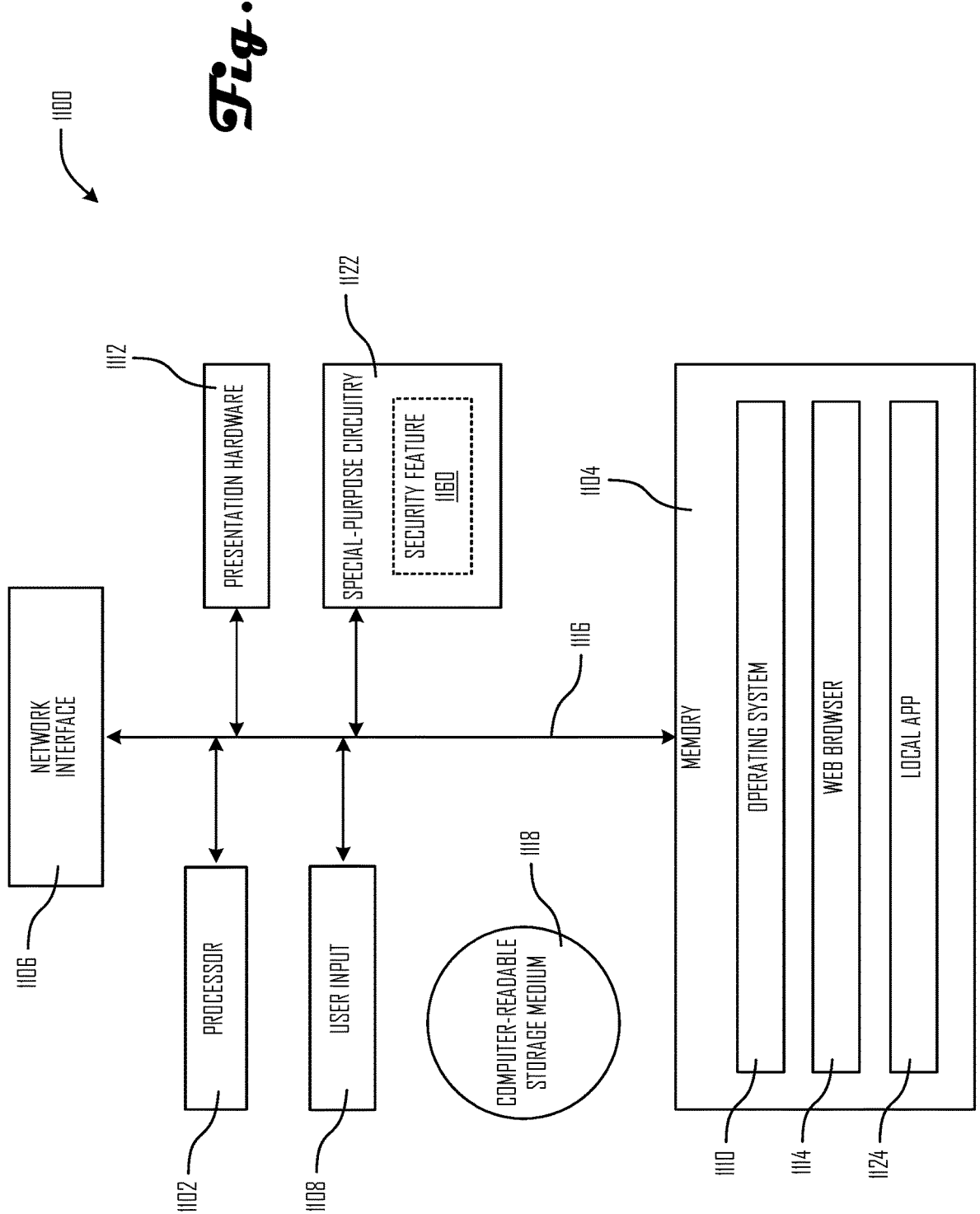

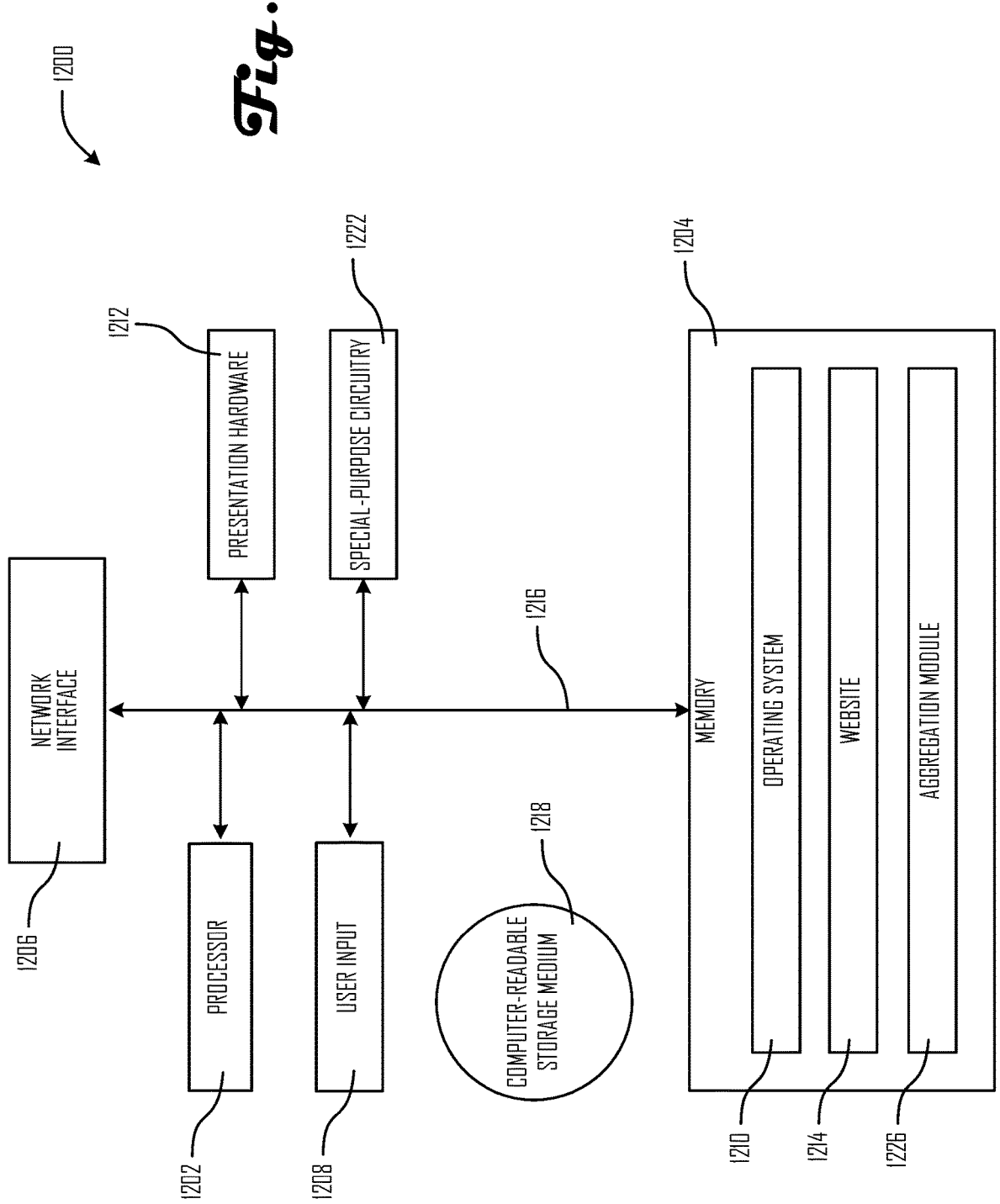

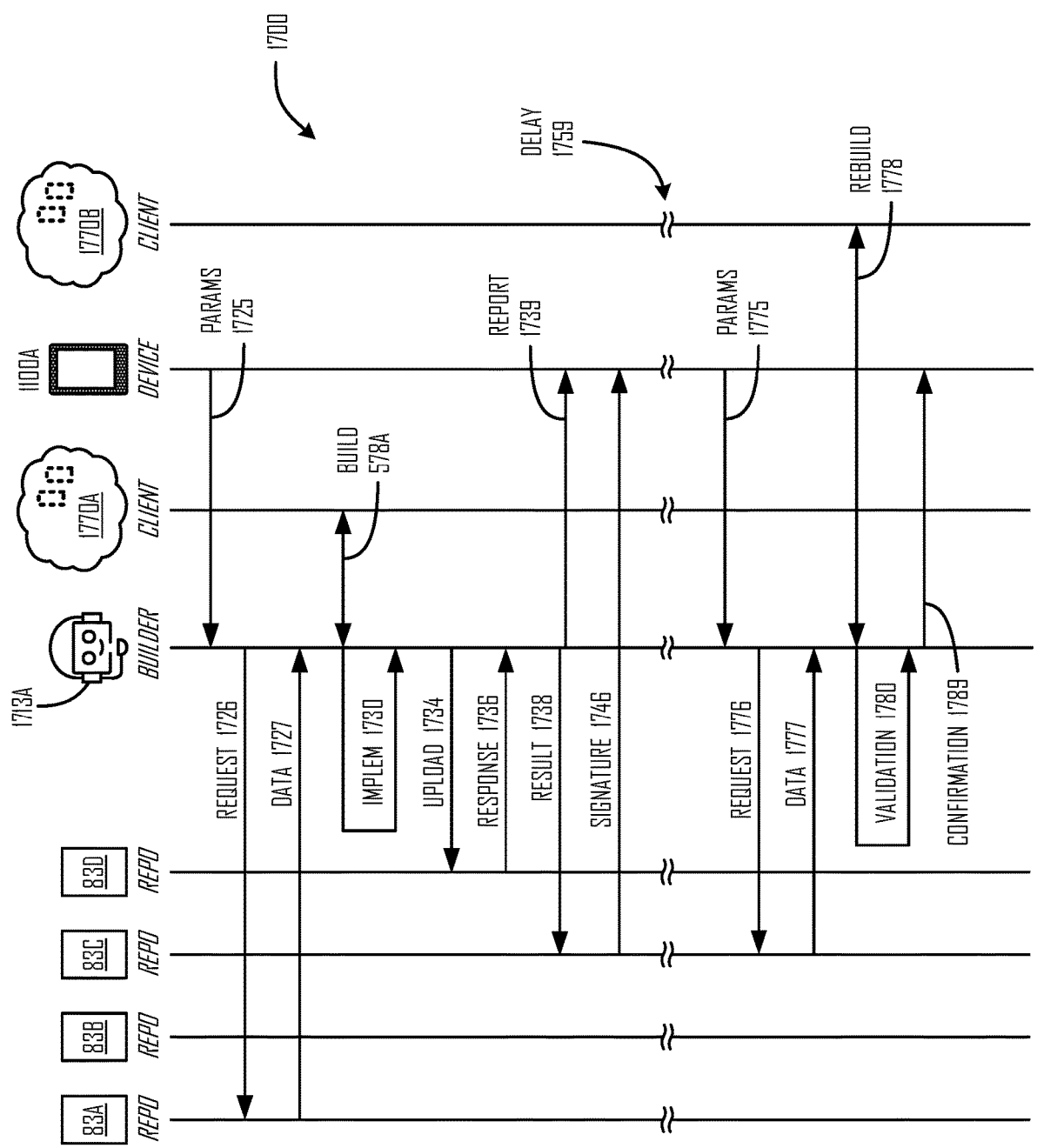

… (US 11,182,508 B1)

ENHANCED VERSION RETENTION SYSTEMS AND METHODS

RELATED APPLICATIONS

None.

BRIEF DESCRIPTION OF THE DRAWINGS

FIG. 11 schematically depicts a client device in which one or more improved technologies may be incorporated.

FIG. 12 schematically depicts a server in which one or more improved technologies may be incorporated.

FIG. 17 depicts an operational flow in which one or more improved technologies may be incorporated.

DETAILED DESCRIPTION

Figure 1:
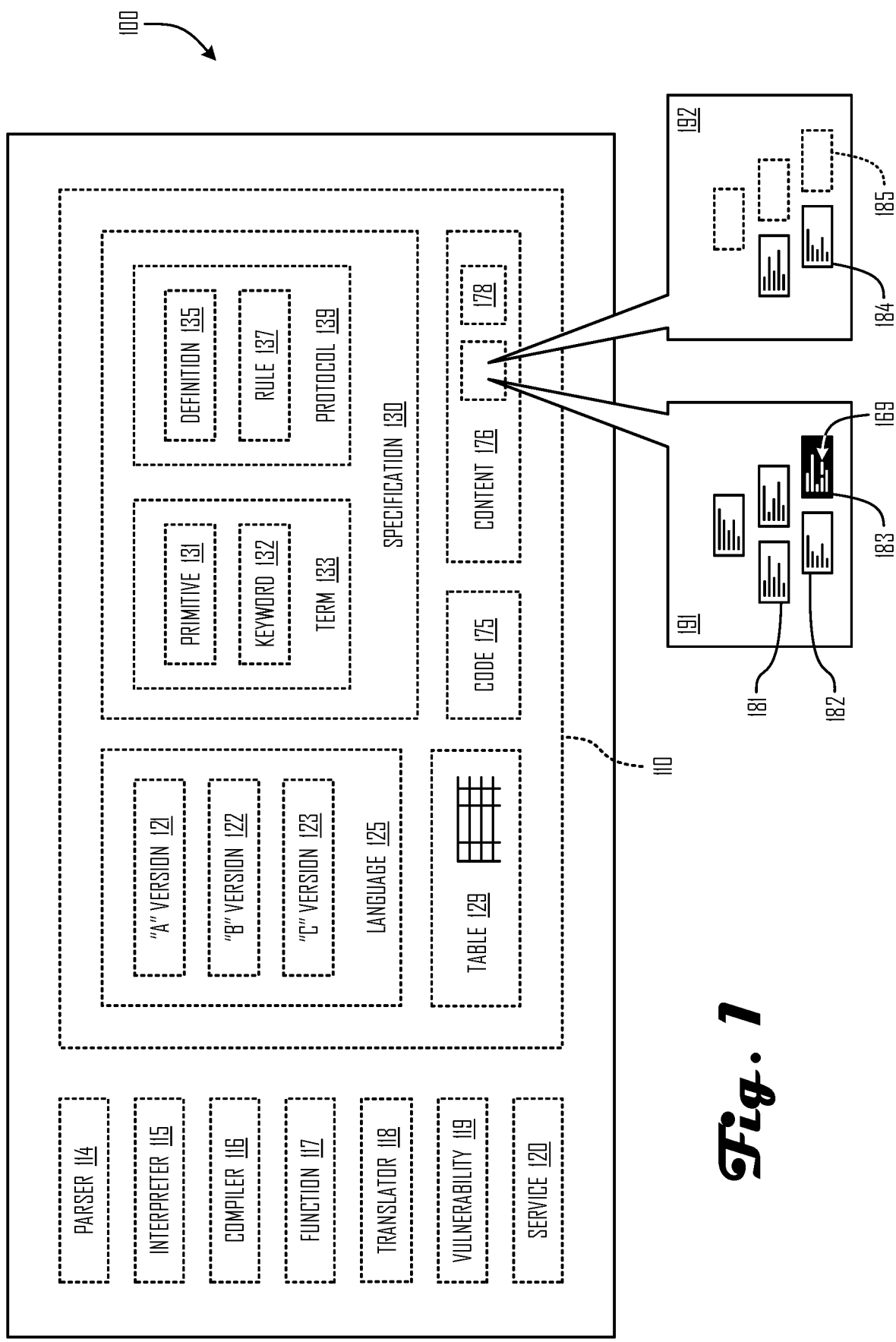
FIG. 1 depicts informational data borne by one or more data-handling media in which one or more improved technologies may be incorporated.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. "After," "alphanumeric," "altered," "application-specific," "associated," "authorized," "automatic," "based," "component," "comprising," "computing," "conditional," "configured," "consecutive," "corresponding," "defined," "detected," "enabled," "executable," "expressed," "facilitated," "first," "identified," "implemented," "in," "indicative," "invoked," "manifested," "new," "obtained," "other," "particular," "preparatory," "private," "protected," "public," "recent," "remote," "removed," "responsive," "scrambled," "second," "semantic," "signaled," "so as," "spawned," "special-purpose," "subsequent," "suggested," "suitable," "supported," "synonymous," "third," "translated," "triggered," "wherein," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Numerous" as used herein refers to more than one dozen. "Instantaneous" as used herein refers to having a duration of less than 0.1 seconds unless context dictates otherwise. "Immediate" as used herein refers to having a duration of less than 2 seconds unless context dictates otherwise. Circuitry or data items are "onboard" as used herein if they are aboard a vehicle or denoting or controlled from a facility or feature incorporated into the main circuit board of a computer or computerized device unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein a term like "PHP parser" or "second-language parser" is used to identify a parser that is configured to parse one or more versions of the identified language but unable to parse one or more other device-executable languages. As used herein "causing" is not limited to a proximate cause but also enabling, conjoining, or other actual causes of an event or phenomenon.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates one or more distributed or other data-handling media 100 comprising one or more instances of parsers 114, of interpreters 115, of compilers 116, of functions 117, of translators 118, of transpilers (e.g., combining a translator 118 with a compiler 116), of vulnerabilities 119, of services 120, or of other such software 110 or other data items in which one or more technologies may be implemented. In some contexts, for example, such items may include various versions 121-123 of expressions of legacy programming languages 125, each at least partly defined by a respective (instance of a) language specification 130. Most primitives 131, keywords 132, or other terms 133 of such languages correspond to one or more instances of definitions 135, of rules 137, or of other protocols 139 of parsing or translation, for example. Such relationships may be manifested in one or more dictionaries or other tables 174, in machine-readable or other programming code 175, or in other content 176 such as translations 178. In some variants, for example, code that exists in a first environment 191 may include several programming instruction series 181-183, some of which may feature a vulnerability 119 by which an exploitative script 169 may be injected or otherwise built, subjecting that environment 191 to malware.

Worse, as naked source code (such as conventional JavaScript or PHP scripts) exhibits such vulnerabilities 119, present and future instruction series 184, 185 in other computing environments 192 may likewise become vulnerable as more and more hackers understand them.

Figure 2:
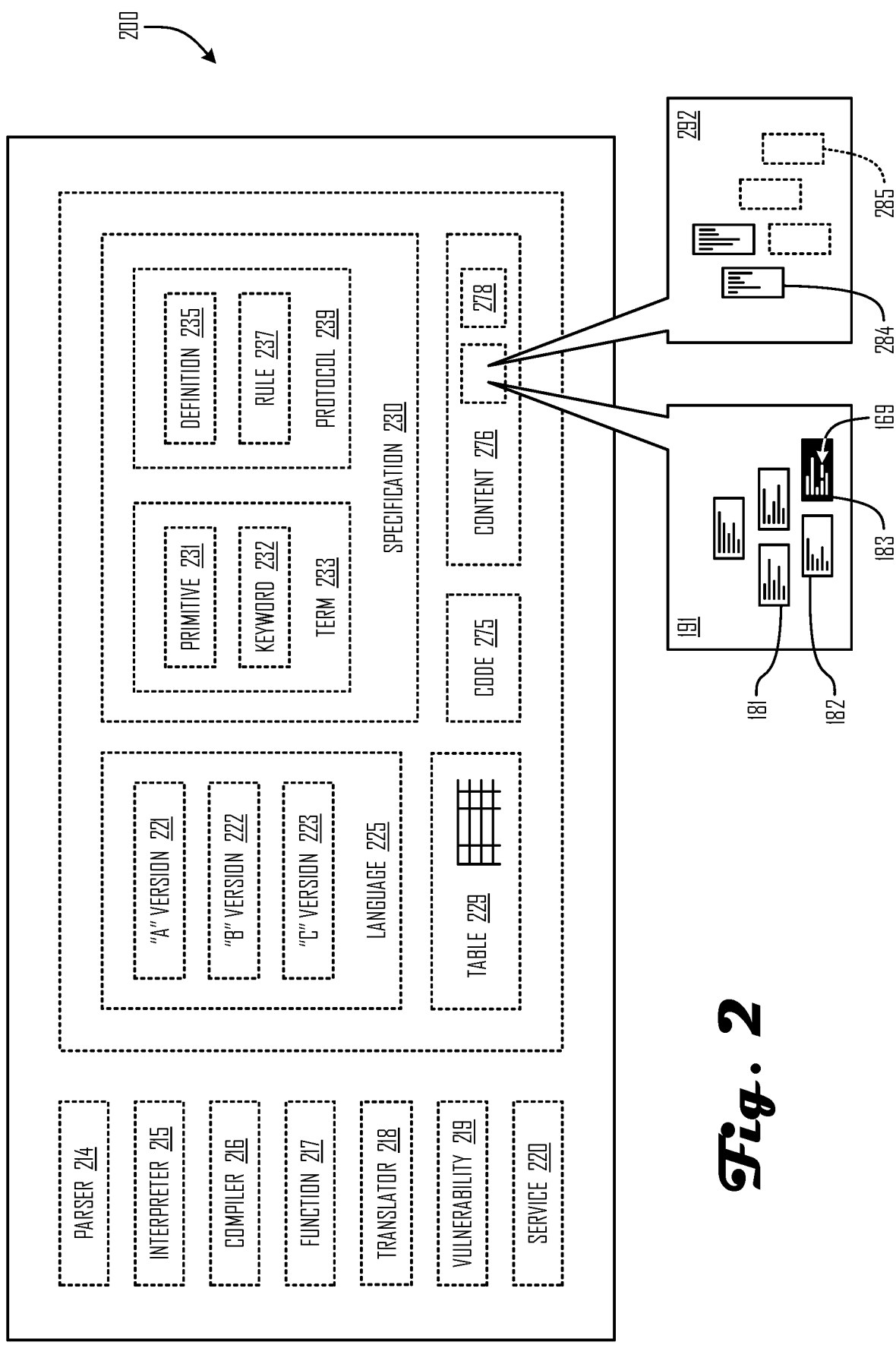
FIG. 2 depicts informational data borne by one or more data-handling media in which one or more improved technologies may be incorporated.

FIG. 2 schematically illustrates one or more memories or other data-handling media 200 comprising one or more instances of parsers 214, of interpreters 215, of compilers 216, of functions 217, of translators 218, of vulnerabilities 219, of services 220, or of other such data items 279 in which one or more technologies may be implemented more safely. In some contexts, for example, such items 279 may include various versions 221-223 of polyscripted or other expressions of systematically diversified programming languages 225 each at least partly defined by a respective (instance of a) language specification 230. Most or all primitives 231, keywords 232, or other terms 233 of each such language 225 described herein correspond to one or more instances of definitions 235, of rules 237, or of other protocols 239 of parsing, for example. Such relationships may be manifested in one or more dictionaries or other tables 274, in machine-readable or other programming code 275, or in other content 276 such as translations 278 by which one or more programming instruction series 281-282 may each migrate to a safer computing environment 292. As used herein terms like "safer" describe a software object relative to another object, signaling that the software object lacks one or more recognized attack-vector-vulnerabilities of the other object.

In some variants, for example, programming instruction series 284-285 may at least avoid a risk of first-language scripts 169 being injected into environment 292 by virtue of environment 292 lacking a first-language interpreter 115 or similar vulnerability 119. In some variants, for example, a suitable second language 225 may be generated by scrambling as described here:

TABLE 1

Algorithm 1 scrambler

```
1:   # set of keywords:
2:   import json
3:   import random
4:   import string
5:   import sys
6:   import re
7:   import subprocess
8:   import signal
9:   import os
10:  from shutil import copyfile
11:  class PolyscriptConfig:
12:      @staticmethod
13:      def random_string(kw_len):
14:          alphabet = string.ascii_lowercase
15:          return ''.join(random.choice(alphabet) for i in range(kw_len))
16:      def __init__(self, kw_len_max=7, kw_len_min=3):
17:          with open('polyscript-config.json') as json_file:
18:              config = json.load(json_file)
19:              self.scramble = config["scramble"]
20:              self.v8_path = config["v8_path"]
21:              self.backup_path = config["backup_path"]
22:              self.dictionary_out = config["dictionary_out"]
23:              self.dictionary = {i: self.random_string(random.randint(kw_len_min, kw_len_max))
24:                                 for i in config["consume"]["keywords"]}
25:      self.changed_files = dict( )
26:  PSC = PolyscriptConfig( )
27:  def backup_file(file_in):
28:      basename = '/' + os.path.basename(file_in)
29:      path = PSC.backup_path
30:      if not os.path.isdir(path):
31:          os.makedirs(path)
32:      PSC.changed_files[file_in] = path + basename
```

TABLE 1-continued

Algorithm 1 scrambler

```
33:         if not os.path.exists(path + basename):
34:             copyfile(file_in, path + basename)
35:     def file_process(input_path, permission, data=None):
36:         file_data = None
37:         try:
38:             with open(input_path, permission) as f:
39:                 if permission == 'r':
40:                     backup_file(input_path)
41:                     file_data = f.read( )
42:                 elif permission == 'w':
43:                     print(input_path)
44:                     file_data = f.write(data)
45:         except IOError as e:
46:             print("I/O error{0}): {1} {2}".format(e.errno, e.strerror, input_path))
47:             print("Attempting to restore original files.")
48:             catch_exit( )
49:         return file_data
50:     def handle_keywords_txt ( ):
51:         for file in PSC.scramble["unquoted_kw"]:
52:             file_path = PSC.v8_path + file
53:             file_data = file_process(file_path, 'r', None)
54:             for keyword in PSC.dictionary.keys( ):
55:                 file_data = file_dataseplace(keyword + ",", PSC.dictionary[keyword] + ",")
56:             file_process(file_path, 'w', file_data)
57:     def handle_string_replace( ):
58:         def string_attach(w):
59:             return "" + w +""
60:         sub_strings = list(map(string_attach, PSC.dictionary))
61:         regexp = re.compile('|'.join(map(re.escape, sub_strings)))
62:         for f in PSC.scramble["quoted_kw"]:
63:             file_data = file_process(PSC.v8_path + f, 'r')
64:             file_process(PSC.v8_path + f, 'w',
65:                 regexp.sub(lambda match: string_attach(PSC.dictionary[match.group(0).strip("")]), file_data))
66:         replace_for_bootstrapper( )
67:     def handle_scanner_inl( ):
68:         parse_start = "#define KEYWORDS(KEYWORD_GROUP, KEYWORD) \\"
69:         parse_end = "\n\n"
70:         file_data = file_process(PSC.v8_path + PSC.scramble["grouped_kw"], 'r')
71:         start_index = file_data.index(parse_start) + len(parse_start)
72:         end_index = file_data[start_index:].index(parse_end) + start_index
73:         pre_parse = file_data[:start_index]
74:         post_parse = file_data[end_index:]
75:         token_groups = file_data[start_index:end_index].split("\n")
76:         file_out = pre_parse + parse_scanner_tokens(token_groups) + post_parse
77:         file_process(PSC.v8_path + PSC.scramble["grouped_kw"], 'w', file_out)
78:     def parse_scanner_tokens(tokens):
79:         tok_str_keyword = re.compile("'(.+?)'")
80:         parse = dict( )
81:         tokens[len(tokens) - 1] = tokens[len(tokens) - 1] + ' \\'
82:         for i in tokens[1:]:
83:             m = tok_str_keyword.findall(i)
84:             if m:
85:                 word = m[0]
86:                 if word in PSC.dictionary:
87:                     i = i.replace(word, PSC.dictionary[word])
88:                     word = PSC.dictionary[word]
89:                 parse[word] = i
90:         return group_keywords(parse)
91:     def group_keywords(parsed):
92:         keys = list(parsed.keys( ))
93:         keys.sort( )
94:         group = "a"
95:         out = " KEYWORD_GROUP('a') \\"
96:         for i in keys:
97:             if not i[0] <=group:
98:                 group = i[0]
99:                 out += "\n" + " KEYWORD_GROUP('" + i[0] + "') \\"
100:            out += "\n" + parsed[i]
101:        return "\n" + out[:-1]
102:    def scramble_sources( ):
103:        handle_keywords_txt( )
104:        handle_scanner_inl( )
105:        handle_string_replace( )
106:    def replace_for_bootstrapper( ):
```

TABLE 1-continued

Algorithm 1 scrambler

```
107:        if 'for' in PSC.dictionary:
108:            out = file_process(PSC.v8_path + "src/init/bootstrapper.cc", 'r')
109:            file_process(PSC.v8_path + "src/init/bootstrapper.cc", 'w',
out.replace(PSC.dictionary["for"], "for"))
110:    def catch_exit( ):
111:        for original_path in PSC.changed_files:
112:            copyfile(PSC.changed_files[original_path], original_path)
113:        print("Original Files restored.")
114:        sys.exit(1)
115:    def handler(signum, frame):
116:        print("SIGINT: Restoring original files.")
117:        catch_exit( )
118:    def restore_originals( ):
119:        if os.path.exists(PSC.backup_path):
120:            print("Backup directory found, replacing previously polyscripted files with originals.")
121:            for dirName, _, fileList in os.walk(PSC.backup_path):
122:                for f in fileList:
123:                    file = dirName + '/' + f
124:                    print(file)
125:                    copyfile(file, file.replace(PSC.backup_path, PSC.v8_path))
126:    def backup_dynamic( ):
127:        for f in PSC.scramble["dynamic"]:
128:            backup_file(PSC.v8_path + f)
129:            gen = file_process(PSC.v8_path + "tools/gen-keywords-gen-h.py", 'r')
130:            file_process(PSC.v8_path + "tools/gen-keywords-gen-h.py", 'w',
''.join(gen.rsplit('128', 1)))
131:    def main( ):
132:        restore_originals( )
133:        if check_empty( ):
134:            return
135:        backup_dynamic( )
136:        scramble_sources( )
137:        file_process(PSC.dictionary_out, 'w', json.dumps(PSC.dictionary, indent=4))
138:        babel_transform( )
139:        final_d8( )
140:        call_subprocess( )
141:        check_fallthrough( )
142:        print("Done. Scrambling Complete.")
143:    def babel_transform( ):
144:        print(PSC.scramble["printer"] + "generators")
145:        (_, _, filenames) = os.walk((PSC.scramble["printer"] + "generators")).next( )
146:        for _file in filenames:
147:            cur_file = PSC.scramble["printer"] + "generators/" + _file
148:            data_in = file_process(cur_file, 'r')
149:            data_out = ''
150:            for _line in data_in.splitlines( ):
151:                if "this.word" in _line and "node.name" not in _line and "'''" not in _line:
152:                    _line = line.replace("word(", "reserved(")
153:                data_out = data_out + os.linesep + _line
154:            file_process(cur_file, 'w', data_out)
155:        printer = file_process(PSC.scrambler[PSC.scramble["printer"] + "printer.js", 'r')
156:        index = printer.index("word(str) {")
157:        out = printer[:index] + """reserved(str) {
158:        var dictionary = {""" + print_dictionary( ) + """}
159:        this.word(str in dictionary ? dictionary[str] : str);
160:        }
161:        """ + printer[index:]
162:        file_process(PSC.scramble["printer"] + "printer.js", 'w', out)
163:    def print_dictionary( ):
164:        items = PSC.dictionary.items( )
165:        items_out = ''.join(map(lambda x: x[0] + ': "' + x[1] + '",', items))
166:        return items_out[:-1]
167:    def call_subprocess( ):
168:        try:
169:            subprocess.check_call(['node', 'polyscriptify.js', '-p', '../test/cctest/'])
170:        except subprocess.CalledProcessError as e:
171:            print("Call Process Error({0}): at {2} - during polyscripting cctest".format(e.returncode, e.output, e.cmd))
172:            print("Attempting to restore original files.")
173:            catch_exit( )
174:        os.chdir(PSC.v8_path)
175:        try:
176:            subprocess.check_call(['python', './tools/gen-keywords-gen-h.py'])
177:        except subprocess.CalledProcessError as e:
178:            print("Call Process Error({0}): {1} at {2}- error calling keyword generator.".format(e.returncode, e.output, e.cmd))
179:            print("ERROR when calling ./tools/gen-keywords-gen-h.py. Failing.")
```

TABLE 1-continued

Algorithm 1 scrambler

```
180:            catch_exit( )
181:            check_fallthrough( )
182:        def check_fallthrough( ):
183:            gen_file = "./src/parsing/keywords-gen.h"
184:            file_process(gen_file, 'w', file_process(gen_file,
'r').replace("/*FALLTHROUGH*/", "U_FALLTHROUGH;", 1))
185:        def final_d8( ):
186:            x = file_process(PSC.v8_path + "src/d8/d8-js.cc", 'r')
187:            starting = x.index("D8(") +len("D8(")
188:            ending = x.index(")D8")
189:            file_process(PSC.v8_path + "src/d8/d8-js.cc", 'w', x[:starting] +
get_poly_snip(x[starting:ending]) + x[ending:])
190:        def check_empty( ):
191:            if PSC.dictionary:
192:                return False
193:            else:
194:                file_process(PSC.dictionary_out, 'w', json.dumps(PSC.dictionary,
indent=4))
195:                return True
196:        def get_poly_snip(snip):
197:            process = subprocess.Popen(['node', 'polyscriptify.js', '-s', snip],
stdout=subprocess.PIPE)
198:            return process.communicate( )[0]
199:        if _name_ == '_main_':
200:            signal.signal(signal.SIGINT, handler)
201:            sys.exit(main( ))
```

Figure 3:
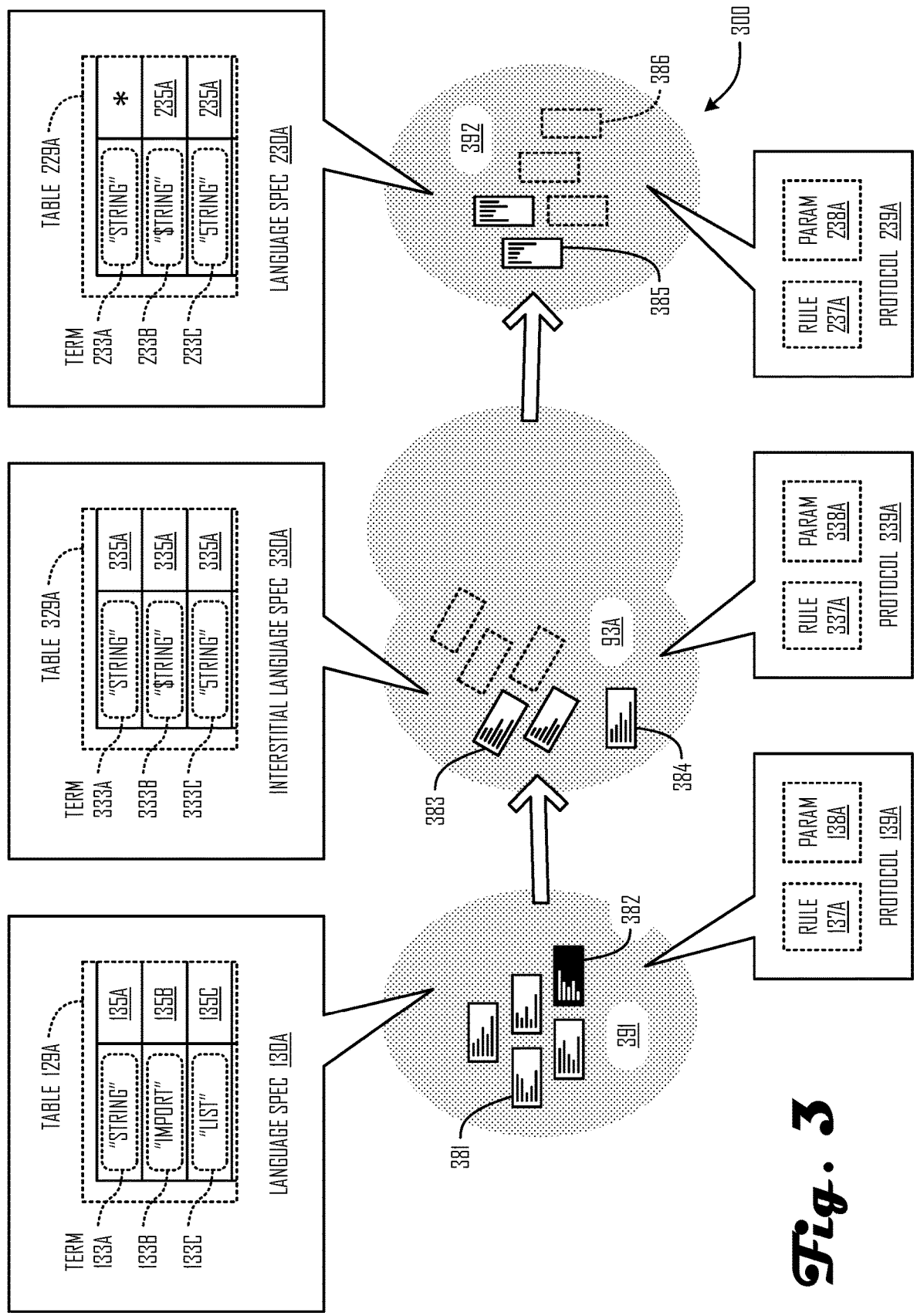
FIG. 3 schematically depicts salient aspects of a system implementing a translational code migration in which one or more technologies may be implemented.

FIG. 3 schematically illustrates salient aspects of a system 300 by which at-risk software 110 that is valid in a first programming language 125 operable in a first environment 391 can migrate to a translated second programming language 225 operable in a safer second environment 392 via one or more interstitial languages operable in one or more interstitial computing or other environments 93A. This can occur, for example, in a context in which the first programming language 125 includes well-known heritage-language terms 133A-C implicitly or otherwise defined in a parser 114, interpreter 115, compiler 116, or other such service 120 operable (e.g., upon one or more instruction series 381, 382) in the first environment 391. For example a language specification 130A of (an instance of) the first language 125 may define a term 133A of "String" with a corresponding definition 135A, a term 133B of "Import" with a corresponding definition 135B, and a term 133C of "List" with a corresponding definition 135C (e.g., in a table 174A thereof). The use of such services 120 may impose one or more instances of rules 137A, of parameters 138A, or of other (aspects of) protocols 139A as further described below.

Likewise, an interstitial language scrambled or otherwise derived from the first programming language 125 may include various corresponding terms 333A-C at least partly defined in a service 120 operable upon instruction series 383 in an interstitial environment 93A as shown. For example an interstitial language specification 330A as shown may define a heritage-language term 333A of "String" with a corresponding definition 335A, a derived term 333B of "String" with an effectively identical definition, and another derived term 333C of "String" with the same definition (e.g., in a table 374A thereof). The use of such services 120 may impose one or more instances of rules 137A, of parameters 138A, or of other (aspects of) protocols 139A as further described below.

In some contexts, one or more instances of rules 337A, of parameters 338A, or of other interstitial-environment protocols 339A may manifest two or more such synonymous terms 333A-C so as to implement interstitial watermarking as described below. Alternatively or additionally such manifestations may implement term aliasing that maintains human-readability in the derived interstitial language or in first-language instruction series 384 selectively accessible in the interstitial environment 93A (e.g., so as to permit inductive function calls to compiled heritage code 175 being triggered by one or more aliased terms 333B-C) as further described below.

Likewise, a language 225 scrambled or otherwise derived from the first programming language 125 may include various corresponding terms 233B-C at least partly defined in a service 220 operable upon instruction series 385, 386 in an environment 392 as shown (e.g., in a table 274A thereof). For example language specification 230A as shown may maintain a derived term 233B of "String" with an effectively identical definition 235A as that of another derived term 233C of "String" so that either will behave (nominally) in the same way when invoked in the environment 392. Alternatively or additionally a heritage-language term 233A like "String" may be rendered inoperable in such downstream environments in some variants of rules 237A, of parameters 238A, or of other downstream-environment protocols 239A. In some variants, for example, such protocols 239A may comprise containerized monitoring, real-time notifications or lockdowns, or other exceptional security event handling.

Figure 4:
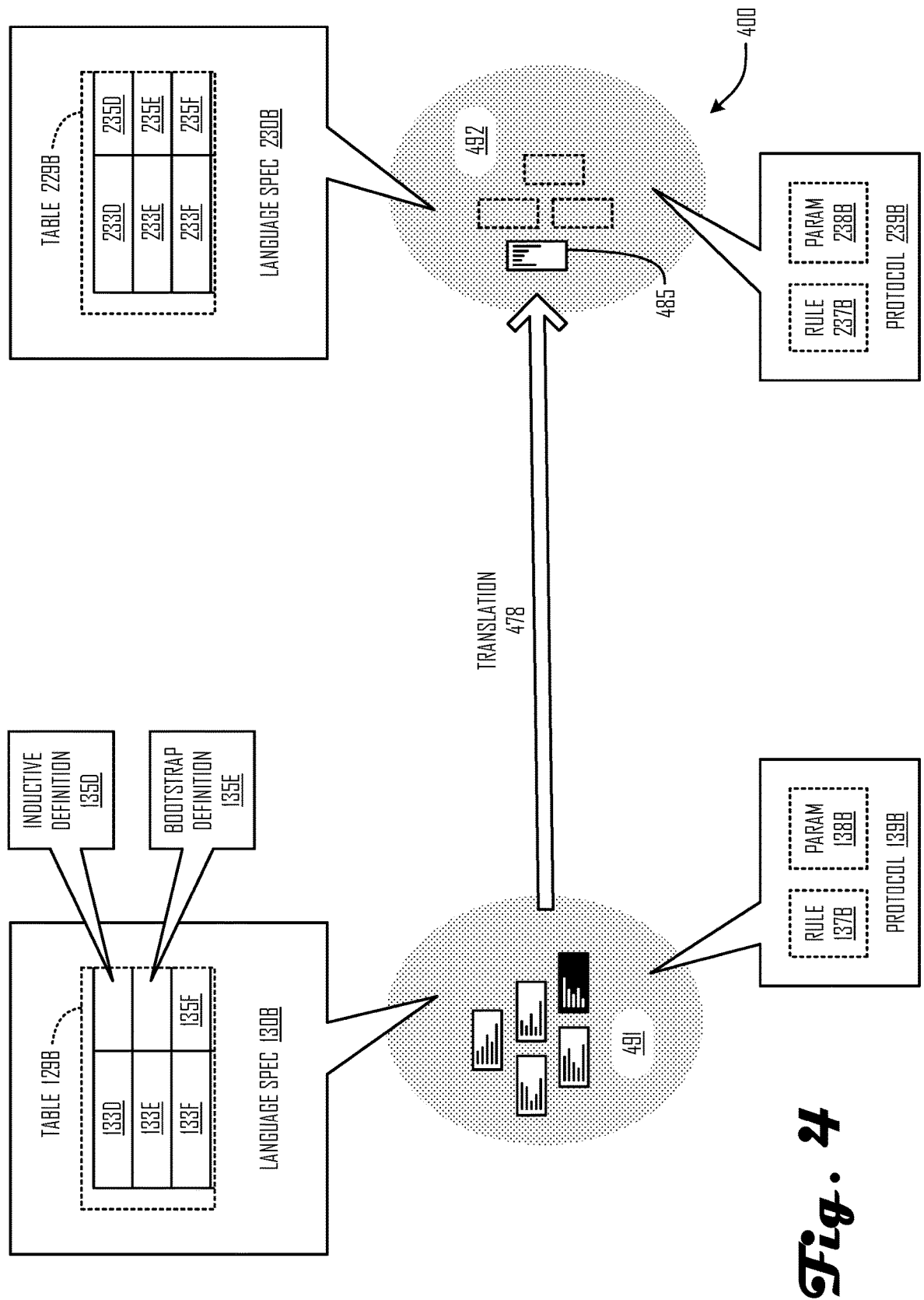
FIG. 4 schematically depicts salient aspects of a system implementing another translational code migration in which one or more technologies may be implemented.

FIG. 4 schematically illustrates salient aspects of a system 400 by which software 110 that is valid in a first programming language 125 operable in a first environment 491 can migrate to a translated second programming language 225 operable in a safer second environment 492 via a compound translation 478 with or without any interstitial environments 93A. This can occur, for example, in a context in which the first programming language 125 includes heritage-language terms 133D-F implemented in a parser 114, interpreter 115, compiler 116, or other such service 120 operable in (an instance of) the first environment 491. For example a language specification 130B of (an instance of) the first language 125 may define a term 133D with a corresponding inductive definition 135D, a term 133E with a corresponding bootstrap definition 135E, and a term 133F with an explicit closed definition 135F (e.g., in a table 174B thereof). The use of such services 120 may impose one or more instances of rules 137B, of parameters 138B, or of other (aspects of) protocols 139B as described herein.

Likewise, a language 225 derived from the first programming language 125 may include human-readable or other corresponding terms 233D-F at least partly defined in a service 220 operable upon instruction series 485 in an environment 492 as shown (e.g., in a table 274B thereof). For example, language specification 230B as shown may include several working definitions 235D-F each corresponding to a respective term even though some such terms were derived from self-referential, bootstrap, or other "open" upstream expressions. In some contexts, in which environment 492 is an instance of environment 392, moreover, one or more rules 237B, parameters 238B, or other downstream-environment protocols 239B may invoke special handling when evidence of injected code 275 or other suspicious phenomena are encountered.

Figure 5:
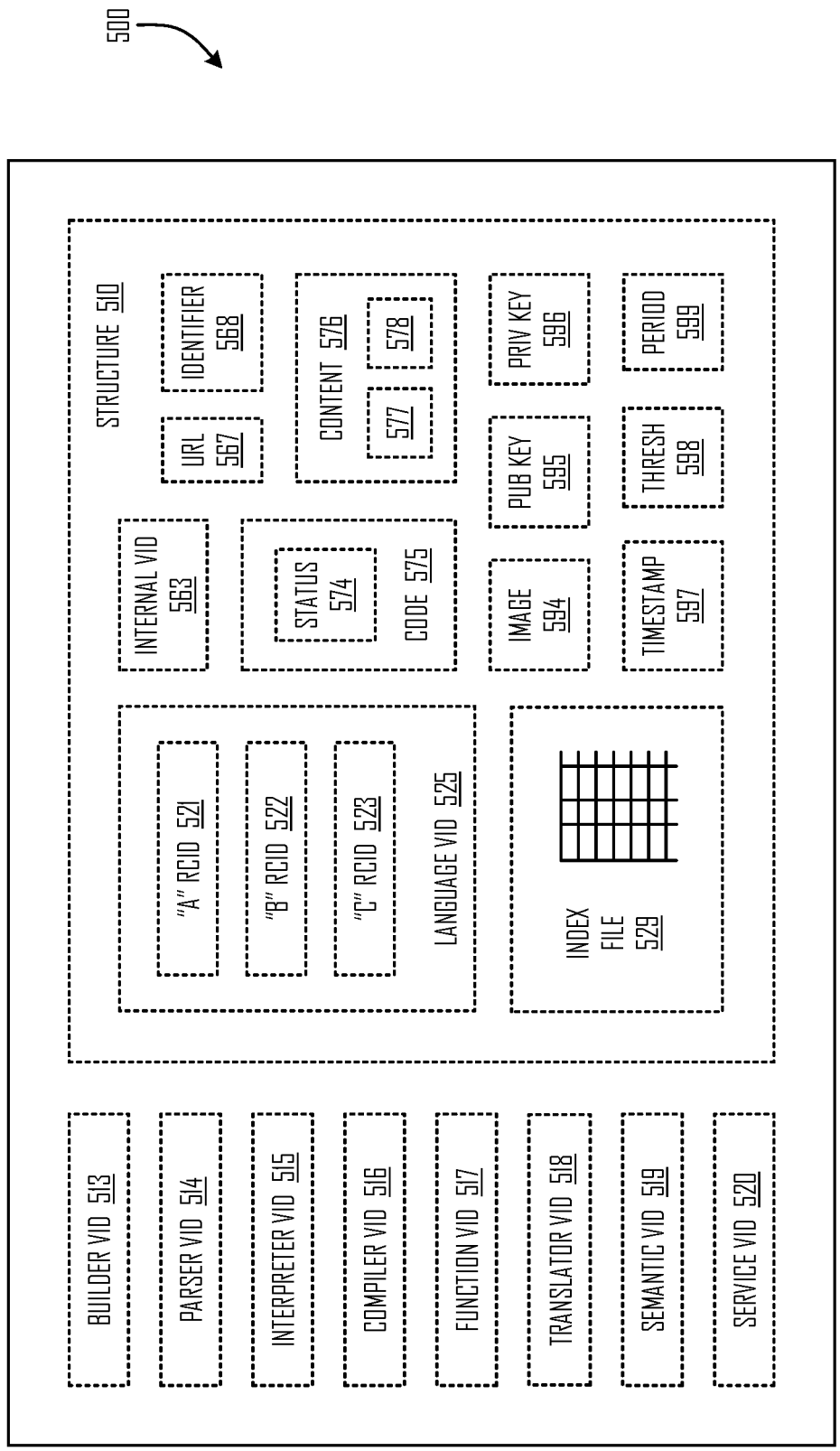
FIG. 5 depicts informational data borne by one or more data-handling media in which one or more improved technologies may be incorporated.

FIG. 5 schematically illustrates one or more distributed or other data-handling media 500 comprising one or more instances of builder version identifiers 513, of parser version identifiers 514, of interpreter version identifiers 515, of just-in-time (JIT) or other compiler version identifiers 516, of function version identifiers 517, of translator version identifiers 518, of semantic version identifiers 519, of service version identifiers 520, or of other names or other alphanumeric expressions of object versioning in which one or more technologies may be implemented. In some contexts, for example, such items may include various resource content identifiers 521-123 of digital expressions in or of various programming languages 525. Associations described herein relating such versions to each other or to other objects may be expressed in one or more index files 529, which may include internal version identifiers 563 as well as coarser expressions of progress. As used herein a "digital resource" may include one or more instances of application instruction series 184, source code, Application Programmer Interfaces (API's) or other digital libraries, operating systems 577, utility tokens or implementations, other device-executable software 110, or a combination thereof.

Some variants described below include one or more instances of universal record locators 567 or other instances of identifiers 568, of statuses 574 or other codes 575, of other content 576 such as operating systems 577 or builds 578, or other digital structures 510 as further described below. Such structures may include one or more instances of images 594, of public keys 595, of private keys 596, of timestamps 597, of thresholds 598, or of relevant time periods 599.

Figure 6:
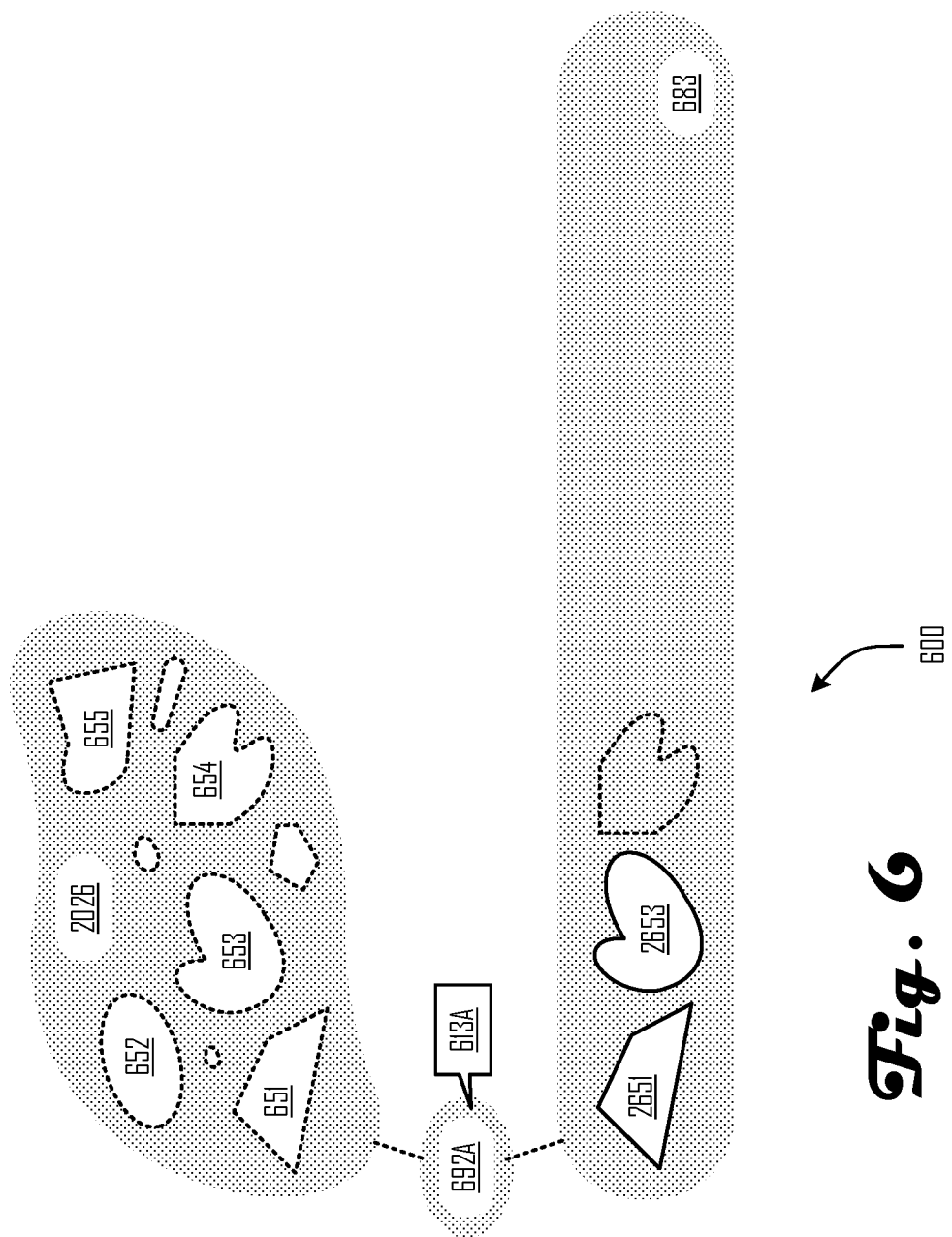
FIG. 6 depicts a computing implementation system in which one or more improved technologies may be incorporated.

FIG. 6 schematically illustrates salient aspects of a system 600 in which access to one or more of the above-described functions will be protected according to one or more technologies described herein. As shown, one or more builders 613A act upon an environment 692A so that one or more primary digital resources 651 therein that previously relied upon (invocations of) ephemeral versions of native secondary digital resources 653 for such functions 117, 217 can instead rely upon reliable replicated (versions of such) resources 2653. To alleviate a risk of functional degradation associated with a network state 2026 that may change soon, such replicated resources may be backed up into one or more repositories 683 each with timestamps 597 signaling time periods in which they were respectively accessed. This can occur, for example, in a context in which such access is performed periodically (checksums or other digital attributes of) recent retrievals are compared to ascertain whether a latest retrieval signals a transition from a prior value and thus warrants retention.

Although such modifications may generally constitute forward progress, various device-executable software may lose functionality also, particularly when they have numerous dependencies upon native secondary digital resources 653-655 controlled by different entities. By proactively exercising systematic diligence so as to preserve target digital resources 651, 653 selectively (e.g. by making corresponding replicated digital resources 2651, 2653 thereof for some digital resources 651, 653 but not all digital resources 652), a reversibility of such fine-grain modifications becomes viable even for large networks. In a context in which a client identifies one or more primary digital resources 651 that invoke one or more functions of native digital resource 654, for example, a responsive replication thereof as shown may be triggered. In some variants a client may designate one or more such resources indirectly, such as by selecting or articulating one or more rules 137, 237, 337 by which designated digital resources may be included into a recordation or excluded from the recordation or other migration.

Figure 7:
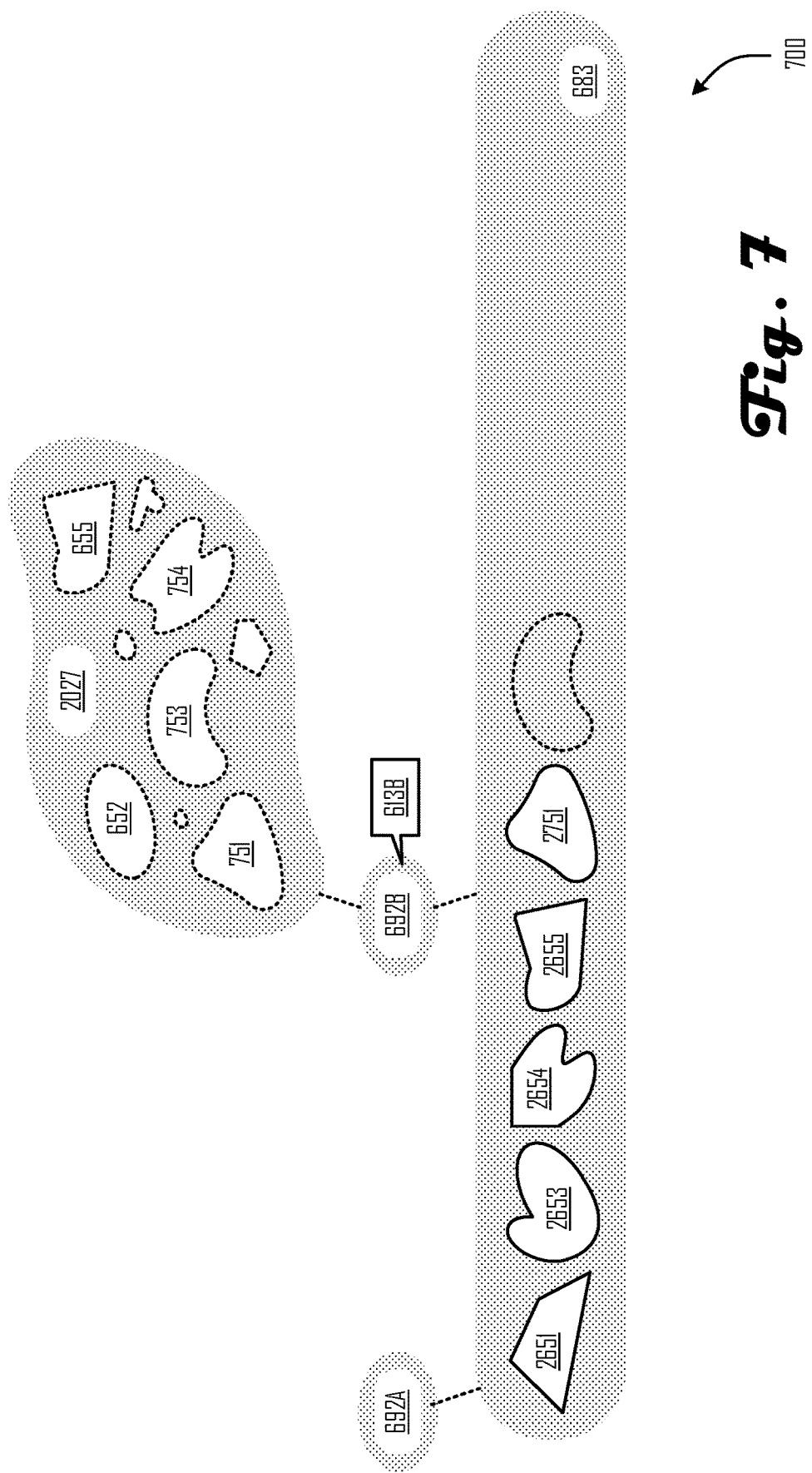
FIG. 7 depicts another system like that of FIG. 6 in which one or more improved technologies may be incorporated.

FIG. 7 schematically illustrates subsequent system 700 in which access to one or more of the above-described functions is being protected according to one or more technologies described herein. As shown, not all digital resources of prior environments 692A remain natively accessible. Network state 2026 no longer exists and in its place is network state 2027. Some digital resources 652, 655 of network state 2026 persist but other digital resources 651, 653, 654 have been superseded or otherwise removed. But replicated primary digital resource 2651 can be used to restore an earlier primary digital resource 651 automatically or upon request, in some embodiments, and the replicated secondary digital resources 2653-2655 may likewise be restored.

Figure 8:
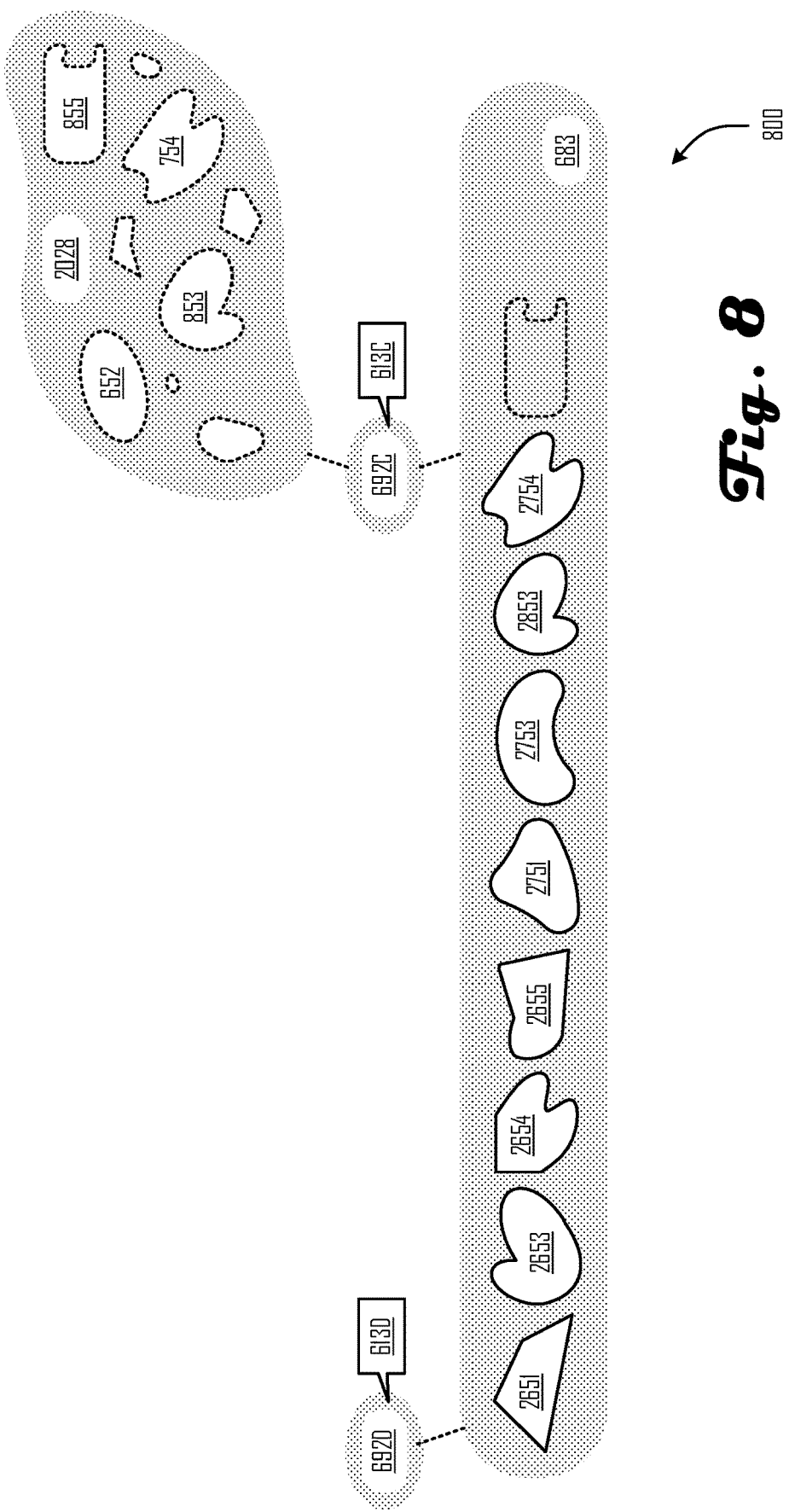
FIG. 8 depicts another system like that of FIGS. 6-7 in which one or more improved technologies may be incorporated.

In addition one or more intermediate builders 613B act upon an environment 692B so that one or more newer primary digital resources 751 therein that rely upon (invocations of) ephemeral versions of native secondary digital resources 753-754 for their functions can instead rely upon reliable replicated (versions of such) digital resources as shown in FIG. 8. To alleviate a risk of functional degradation associated with a network state 2027 that may change soon, such replicated digital resources 2751 may likewise be written into the one or more repositories 683 each with timestamps 597 signaling when they were respectively accessed.

FIG. 8 schematically illustrates another subsequent system 800 in which access to one or more of the above-described functions is being protected according to one or more technologies described herein. As shown, not all aspects of environment 692B remain functional. Network state 2027 has been supplanted by network state 2028. As shown some native digital resources 652, 754 of prior network states 2026, 2027 persist but other digital resources 655, 751, 753 no longer operate natively. But replicated primary digital resource 2751 can be used to restore primary digital resource 751 as needed, and one or more replicated secondary digital resources 2753 upon which it depends may also be restored automatically or on request (or both).

In addition one or more advanced builders 613C act upon an environment 692C so that newer primary digital resources 855 therein that rely upon (invocations of) ephemeral versions of native secondary digital resources 853 for their functions can instead rely upon reliable replicated (versions of such) digital resources 2853 as shown. To alleviate a risk of functional degradation associated with a network state 2028 that may change soon, such replicated digital resources 2753, 2754 may likewise be retrieved into the one or more repositories 683 each with timestamps 597 or other appropriate indicia of versioning.

Alternatively or additionally one or more such outdated builders 613A may be adapted to facilitate translations 278 or other variant implementations of an outdated environment 692A, depicted in FIG. 8 as an "alternate" environment 692D acted upon by one or more alternate builders 613D. Such implementations may mitigate a vulnerability 119 that would otherwise be re-introduced by reverting to an outdated environment 692A or builder 613A. See descriptions of FIGS. 9 and 13-19 below.

Figure 9:
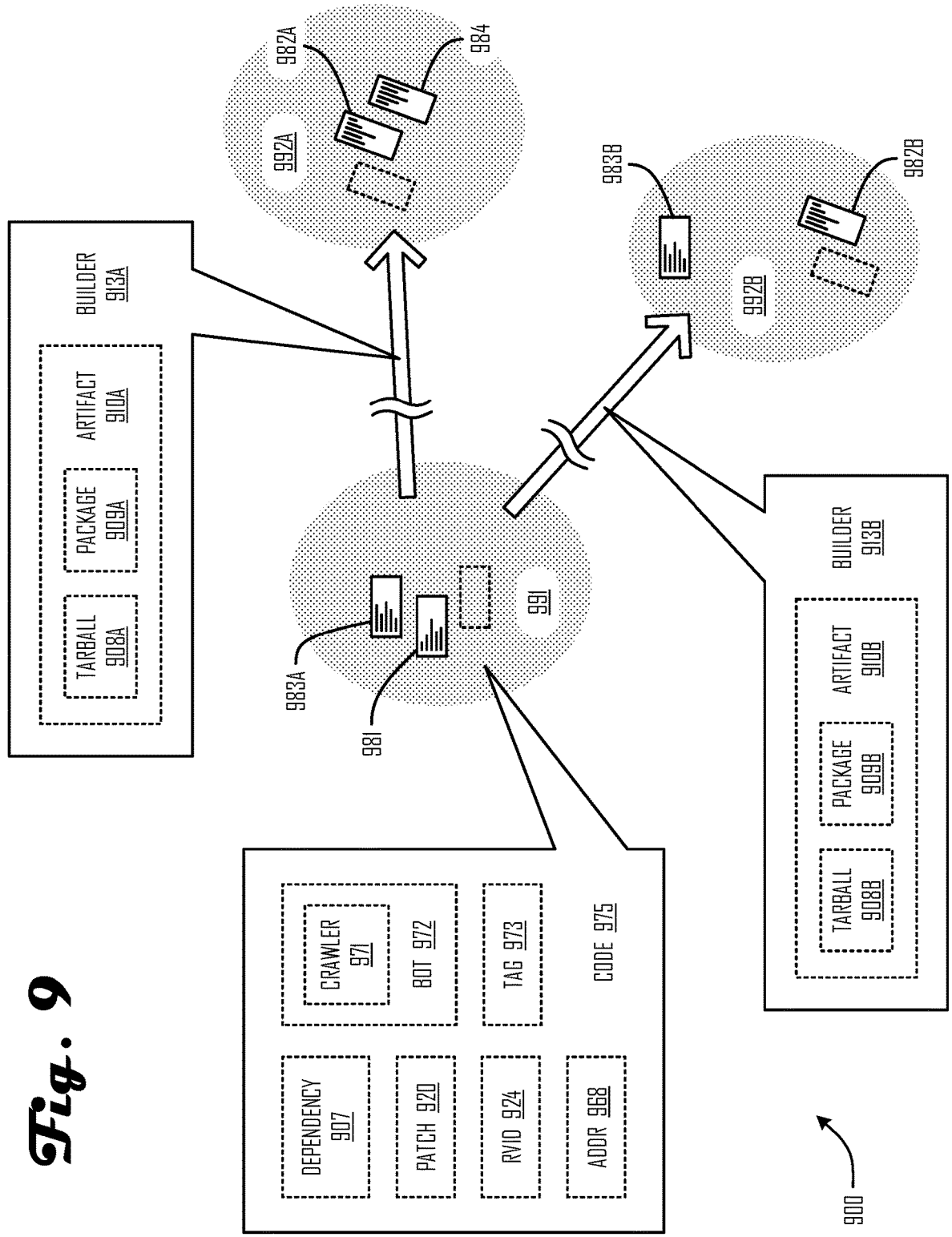
FIG. 9 schematically depicts salient aspects of a system implementing a code migration in which one or more technologies may be implemented.

FIG. 9 schematically illustrates salient aspects of a system 900 by which software 110 that is operable in a first environment 991 can migrate to one or more other environments 992A-B, either of which may be an instance of the above-described safer environments 292, 392, 492, 692. In some contexts, for example, each instruction series 981, 983A that migrates (e.g. to become series 982A and series 984 as shown) is fully transformed and thereby made subject to a single set of rules 237, of parameters 238, or of protocols 239 of a monolithic destination environment 992A. In other destinations, a subset of instruction series 981 that migrates (e.g. to become series 982B as shown) is fully transformed and thereby made subject to a first set of rules 237, of parameters 238, or of protocols 239 of a hybrid destination environment 992B. But another subset of instruction series 983A that migrates (e.g. to become series 983B as shown) is unsuccessfully built or otherwise unsuitable for full transformation, necessitating another set of (one or more) rules 237, of parameters 238, or of protocols 239 of the hybrid destination environment 992B. In some variants, for example, more vetting may be applied upon all users or processes before access to the latter is permitted.

In an effort to reduce reliance upon one or more upstream environments 191, 991 being maintained, a builder 913A of one or more destination environments 992A may preserve a tarball 908A or other package 909A as artifacts 910A by which some or all digital resources of the upstream environment(s) 191, 991 may be migrated, tracked, or preserved. Such digital resources may include one or more instances of dependencies 907, of patches 920, of release version identifiers 924 or other primary version identifiers, of addresses 968, of crawlers 971 or other bots 972 that aggregate such digital resources, of tags 973 describing such digital resources, or of other such instances of code 975. Likewise a builder 913B of (one or more) other destination environments 992B may preserve a tarball 908B or other package 909B as artifacts 910B by which some or all digital resources of the upstream environment(s) 191, 991 may be migrated, tracked, or preserved.

Figure 10:
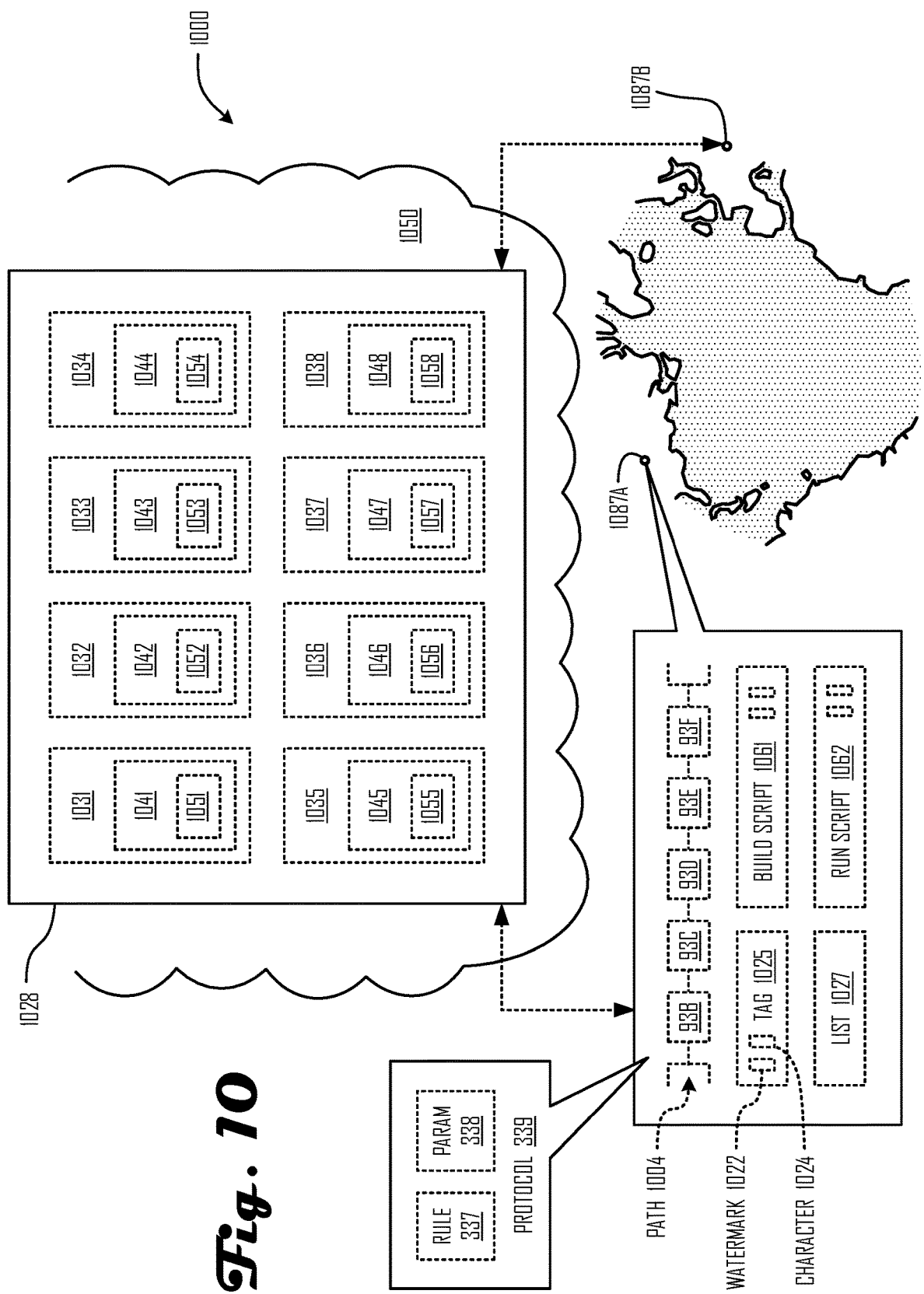
FIG. 10 schematically depicts salient aspects of a system implementing another translational code migration in which one or more technologies may be implemented to facilitate trans-oceanic interactions.

FIG. 10 schematically illustrates one or more distributed or other data-handling system 1000 configured to facilitate trans-oceanic monitoring and comprising transistor-based circuitry 1028 in one or more data networks 1050, in which one or more technologies may be implemented. In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session parameters or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 1028 may comprise one or more integrated circuits (ICs), for example, optionally mounted on one or more circuit boards. Whether implemented in a distributed cloud or within one or more apparatuses 1087A-B described herein, transistor-based circuitry 1028 comprises an event-sequencing structure generally as described in U.S. Pat. Pub. No. 2015/0094046 but configured as described herein. Transistor-based circuitry 1028 may (optionally) include one or more instances of parsing modules 1031-1032 configured for local processing, for example, each including an electrical node set 1041-1042 upon which informational data is represented digitally as a corresponding voltage configuration 1051-1052. Transistor-based circuitry 1028 may likewise include one or more instances of configuration modules 1033 configured for triggering remote processing (using cloud-based instances of circuitry described herein, for example), each including an electrical node set 1043 upon which informational data is represented digitally as a corresponding voltage configuration 1053. Transistor-based circuitry 1028 may (optionally) likewise include one or more instances of recognition modules 1034 configured for triggering remote processing (using cloud-based instances of circuitry described herein, for example), each including an electrical node set 1044 upon which informational data is represented digitally as a corresponding voltage configuration 1054. Transistor-based circuitry 1028 may likewise include one or more instances of interface modules 1035-1036 configured for engaging a builder 613, 1413 or other suitable agent, each including an electrical node set 1045-1046 upon which informational data is represented digitally as a corresponding voltage configuration 1055-1056. Transistor-based circuitry 1028 may (optionally) likewise include one or more instances of processing modules 1037 configured for selecting a builder 1413 or other suitable agent, each including an electrical node set 1047 upon which informational data is represented digitally as a corresponding voltage configuration 1057. Transistor-based circuitry 1028 may likewise include one or more instances of invocation modules 1038 configured for invoking other particular modules selectively as described herein, each including an electrical node set 1048 upon which informational data is represented digitally as a corresponding voltage configuration 1058.

In some variants, for example, a server or other apparatus 1087A in North America may manifest an instance of a migration path 1004 between an original computing environment 191, 391, 491 and a computing environment 292, 392, 492, 692. Some such paths may pass through multiple computing or other interstitial environments 93B-F of which some may provide one or more rules 337, parameters 338, or other aspects of respective protocols 339 thereof to implement one or more watermarks 1022 or other security tags 1025 thereof, such as with a judicious use of non-printing characters. Alternatively, or additionally, cloud implementation circuitry 1028 or a local apparatus 1087A (or a combination thereof) may maintain a list 1027 of tasks, needs, or digital resources as further described below. Alternatively, or additionally, one or more such interstitial environments 93B-F may (optionally) each need a respective build script 1061 or run script 1062 or both as further described below, so that several clients seeking access to upstream content may each be monitored in a respectively distinct interstitial environment. Data flow diagrams featuring a remote apparatus 1087B (e.g. a client, hub, or hacker in Europe) are provided below.

As used herein a "version" of a digital object refers to a variant having partial structural identically with the object or partial functional identically with the object (or both). For example, two "versions" of semicolons may exist in respective programming languages 125, 225 if at least one rule 137, 237, 337 applicable to one does not apply to the other. As used herein a first version 121-123 of an instruction series or other software object is "less safe" than a second version 221-223 of the object if one or more vulnerabilities 119 present in the first version are not present in the second version. In some contexts, it is advantageous to migrate a population of instruction series to a less-safe language version or environment 93C-D (e.g., to facilitate access by an authenticated entity for analysis or augmentation) and then to a safer version or environment 93E. As used herein a modification of a digital item is "facilitated" by triggering, enabling, defining, signaling, or causing the modification (or a combination of these).

Referring now to FIG. 11, there is shown a client device 1100 in which one or more technologies may be implemented. Client device 1100 may include one or more instances of processors 1102, of memories 1104, user inputs 1108, and of (speakers or other) presentation hardware 1112 all interconnected along with the network interface 1106 via a bus 1116. One or more network interfaces 1106 allow device 1100 to connect via the Internet or other networks 150). Memory 1104 generally comprises a random-access memory ("RAM"), a read only memory ("ROM"), and a permanent mass storage device, such as a disk drive.

Memory 1104 may contain one or more instances of operating systems 1110, of web browsers 1114, of other local apps 1124, or of other modules that facilitate operations described herein. These and other software components may be loaded from a non-transitory computer readable storage medium 1118 into memory 1104 of the client device 1100 using a drive mechanism (not shown) associated with a non-transitory computer readable storage medium 1118, such as a floppy disc, tape, DVD/CD-ROM drive, flash card, memory card, or the like. In some embodiments, software or other digital components may be loaded via the network interface 1106, rather than via a computer readable storage medium 1118. Special-purpose circuitry 1122 (implementing a security feature 1160, e.g.) may, in some variants, include some or all of the event-sequencing logic described herein. In some embodiments client device 1100 may include many more components than those shown in FIG. 11, but it is not necessary that all conventional components of a mobile device be shown in order to disclose an illustrative embodiment.

Referring now to FIG. 12, there is shown a server 1200 in which one or more technologies may be implemented. Server 1200 may include one or more instances of processors 1202, of memories 1204, user inputs 1208, and of (speakers or other) presentation hardware 1212 all interconnected along with the network interface 1206 via a bus 1216. One or more network interfaces 1206 allow server 1200 to connect via the Internet or other networks 150). Memory 1204 generally comprises a random-access memory ("RAM"), a read only memory ("ROM"), and a permanent mass storage device, such as a disk drive.

Memory 1204 may contain one or more instances of operating systems 1210, of websites 1214, of aggregation modules 1226, or of preference implementation services or other such control modules that facilitate modeling the preferences of a user/client. These and other software components may be loaded from a non-transitory computer readable storage medium 1218 into memory 1204 of the server 1200 using a drive mechanism (not shown) associated with a non-transitory computer readable storage medium 1218, such as a floppy disc, tape, DVD/CD-ROM drive, flash card, memory card, or the like. In some embodiments, software or other digital components may be loaded via the network interface 1206, rather than via a computer readable storage medium 1218. Special-purpose circuitry 1222 may, in some variants, include some or all of the event-sequencing logic described herein. In some embodiments server 1200 may include many more components than those shown in FIG. 12, but it is not necessary that all conventional components of a server be shown in order to disclose an illustrative embodiment.

Figure 13:
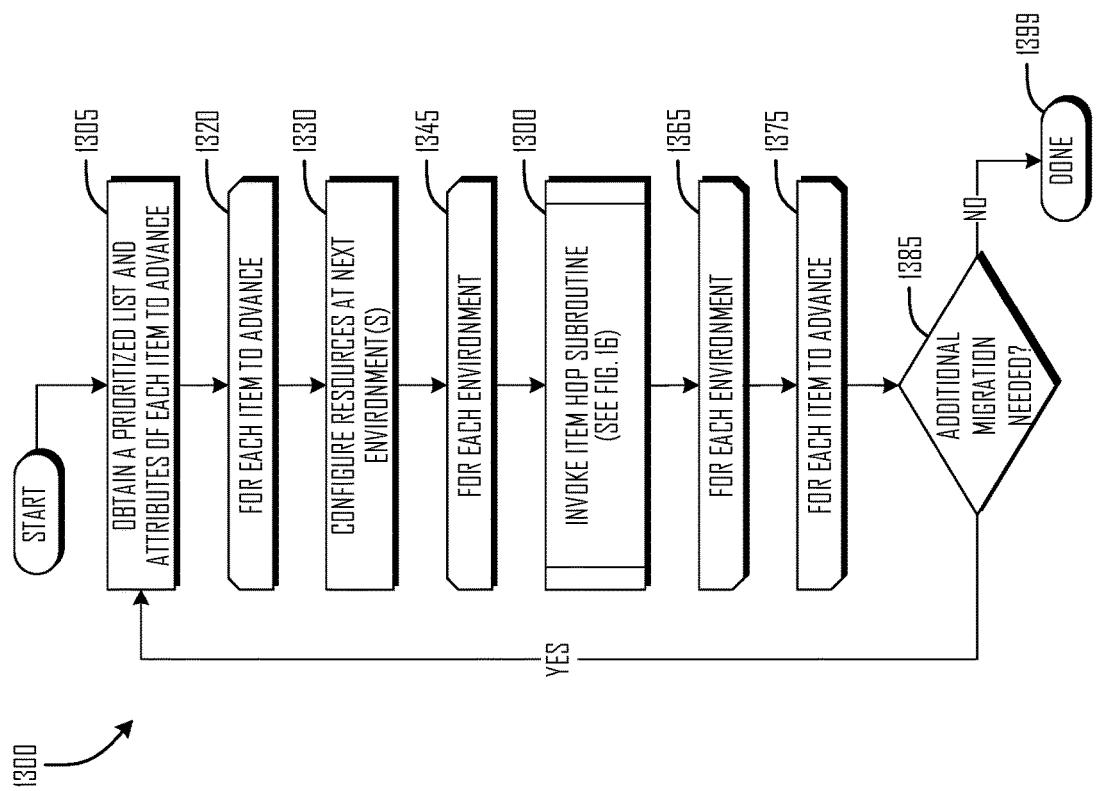
FIG. 13 depicts a flow diagram in which one or more improved technologies may be incorporated.

FIG. 13 illustrates an operational flow 1300 suitable for use with at least one embodiment, such as may be performed on a client device 1100 or server 1200 using special-purpose circuitry thereof. As will be recognized by those having ordinary skill in the art, not all events of information management are illustrated in FIG. 13. Rather, for clarity, only those steps reasonably relevant to describing the security-enhanced computing interaction aspects of flow 1300 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1305 describes obtaining a prioritized list and attributes for each instruction series or similar item to advance.

Operation 1320 begins an iterative protocol performed upon each instruction series or other item that may be needed in one or more downstream environments.

Operation 1330 performs a configuration of any authorizations or similar digital resources that may be needed along an intended path for the item.

Operation 1345 begins an iterative protocol performed upon each successive movement of the current item to a next downstream environment.

Operation 1600 signals invoking a flow by which the item may be advanced to the next downstream environment. See FIG. 16.

Operation 1365 signals a repetition or conclusion of the iterative protocol performed to advance the current item downstream.

Operation 1375 signals a repetition or conclusion of the iterative protocol performed upon each item moved.

Operation 1385 signals a determination whether a current list still signals one or more migrations are needed. If so, control passes back to operation 1305.

Otherwise operation 1399 signals a completion of the operational flow 1300, such as by returning a result signaling a successful migration.

Figure 14:
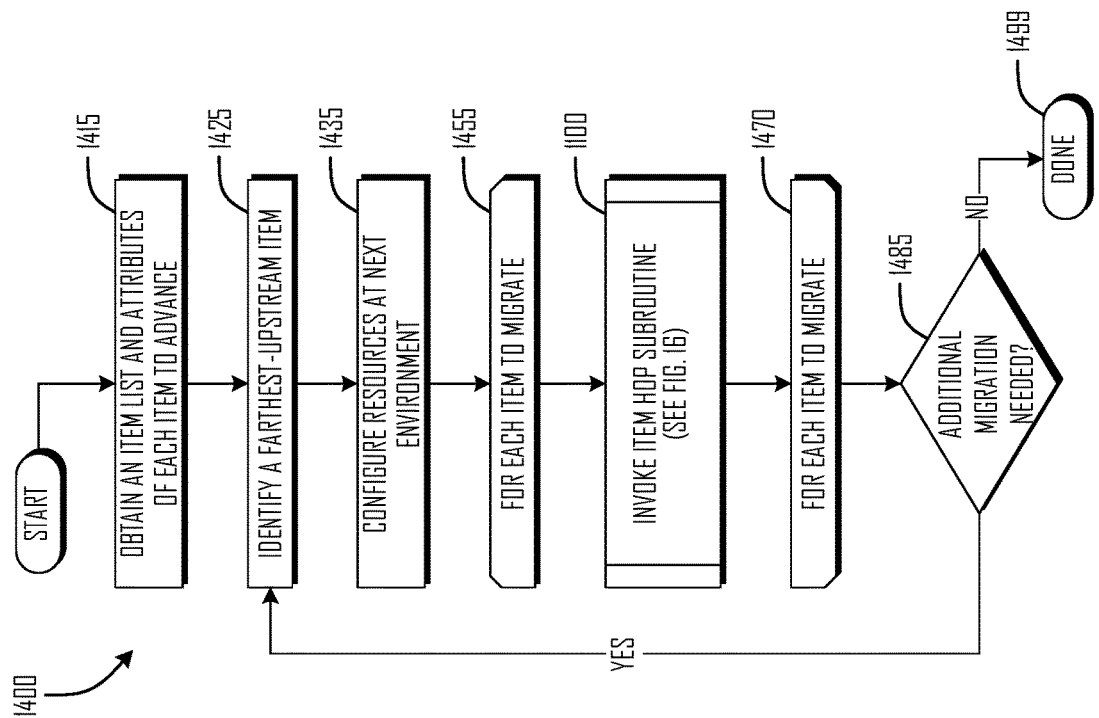
FIG. 14 depicts another flow diagram in which one or more improved technologies may be incorporated.

FIG. 14 illustrates an operational flow 1400 suitable for use with at least one embodiment, such as may be performed on a client device 1100 or server 1200 using special-purpose circuitry thereof. As will be recognized by those having ordinary skill in the art, not all events of information management are illustrated in FIG. 14. Rather, for clarity, only those steps reasonably relevant to describing the security-enhanced computing interaction aspects of flow 1400 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1415 describes obtaining an item list and attributes for each instruction series or similar item to advance.

Operation 1425 describes identifying a farthest-upstream item.

Operation 1435 describes configuring one or more digital resources at a next environment for which the furthest-upstream item is bound.

Operation 1455 begins an iterative protocol by which other items alongside the furthest-upstream item are designated in turn.

Operation 1600 signals invoking a flow by which the item may be advanced to the next downstream environment. See FIG. 16.

Operation 1470 signals a repetition or conclusion of the iterative protocol performed upon each item moved.

Operation 1485 signals a determination whether a current list still signals one or more migrations are needed. If so, control passes back to operation 1425.

Otherwise operation 1499 signals a completion of the operational flow 1400, such as by returning a result signaling a successful migration.

Figure 15:
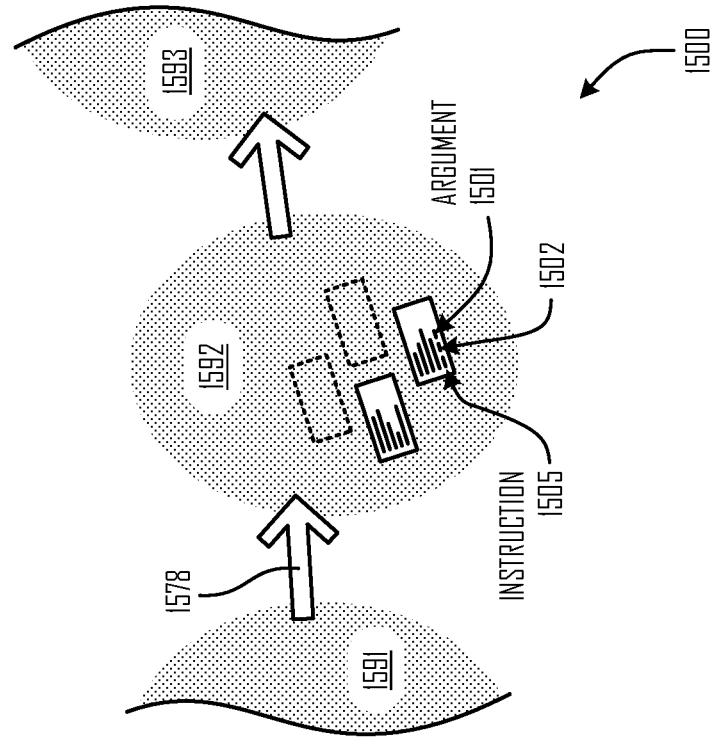
FIG. 15 schematically depicts a "waypoint" environment that may exist in migratory contexts described herein.

Referring now to FIG. 15, there is shown a waypoint 1500 comprising an interstitial environment 1592 positioned between one or more upstream environments 1591 and one or more downstream environment 1593. The one or more upstream environments feature an established or other legacy language specification 130 in which at least one (kind of) legacy instruction 1505 defines a first argument 1501 and a second argument 1502 in that order. As a part of one or more upstream translations 1578, however, a transposition is implemented so that in the instruction 1505 at environment 1592, a corresponding first argument 1501 must be presented after a corresponding second argument 1502. Such a translation 1578 might effectively convert an IF-THEN instruction in a legacy language into a TH #N-/F instruction, for example, confounding malware that could otherwise glean or modify the meaning of an instruction series that included one or more such modified-grammar instructions 1505.

Figure 16:
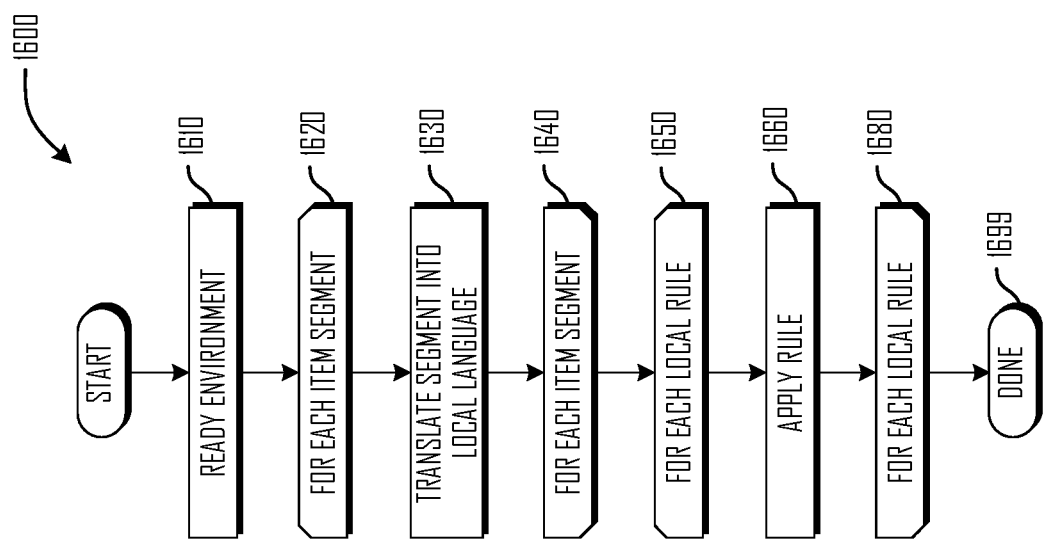
FIG. 16 depicts another flow diagram in which one or more improved technologies may be incorporated, one that may be used in flows like those of FIGS. 13-14.

FIG. 16 illustrates an operational flow 1600 suitable for use with at least one embodiment, such as may be performed on a client device 1100 or server 1200 (or both) using special-purpose circuitry thereof. As will be recognized by those having ordinary skill in the art, not all events of information management are illustrated in FIG. 16. Rather, for clarity, only those steps reasonably relevant to describing the security-enhanced computing interaction aspects of flow 1600 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1610 describes readying an environment, such as by retrieving, accessing, or otherwise obtaining a translator 218 or local language specification 230 (e.g., pertaining to an instantiation of one or more environments 292, 392, 1592 described herein) or allocating computing digital resources for its use.

Operation 1620 begins an iterative protocol performed upon each instruction or other item segment (e.g., during an instruction series translation).

Operation 1630 performs a translation upon that segment from an upstream language into a current local language. As used herein a "local" feature may pertain to an interstitial or environment, irrespective of physical geography.

Operation 1640 signals a repetition or conclusion of the iterative protocol performed upon each item segment.

Operation 1650 begins an iterative protocol pertaining to each local rule (e.g., for multiple validation or security rules 237, 337 imposed by the local environment 292, 392, 1592).

Operation 1660 applies the rule of the current iteration.

Operation 1680 signals a repetition or conclusion of the iterative protocol performed upon each local rule.

Operation 1699 signals a completion of the operational flow 1600, such as by returning a result to a flow 1300, 1400 that invoked flow 1600.

FIG. 17 depicts a particular scenario and progressive data flow 1700 in which client devices 1100 of respective human clients 10A-B interact with one or more servers 1200 to facilitate creation or restoration of protected computing environments described herein. After an authentication 1722A in which client 10A and cloud server 1200A each provide a keyword or other identifying information, one or more parameters 1724A are downloaded to initiate a session 1726A during which one or more client devices 1100 of that client 10A have access to a unique environment derived from and accessible only with a combination of such identifying information from both sides.

Likewise, after an authentication 1722B in which a non-human hub 20 and cloud server 1200A each provide a keyword or other identifying information, one or more parameters 1724B are downloaded to initiate a session 1726B during which the hub has access to a unique environment derived from and accessible only with a combination of such identifying information from both the hub 20 and the server 1200A. Likewise after an authentication 1722C in which one or more other human clients 10B and cloud server 1200A each provide a keyword or other identifying information, one or more parameters 1724C are downloaded to initiate a session 1726C during which one or more respective client devices 1100 of those clients 10B have access to a unique environment derived from and accessible only with a combination of such identifying information from both/all sides.

In this way, cloud server 1200A may facilitate respective secure environments such that sharing digital resources among clients occurs only in one-off environments 1592 of which other entities are expected to have no access. As such a time-limited additional authentication 1722D may be imposed by the server 1200A on an unscheduled basis or in response to alien watermarks 1022, unexpected hidden characters 1024, behavioral deviations from that of a prior code version 221-223, or other such unforeseen phenomena being detected (e.g., by one or more risk-indicative-pattern recognition modules 1037) in such one-off environments 1592. Such measures can be even for instruction series originally created in an open programming language 125 not conventionally susceptible of migratory translations 178, 1578 as described herein.

In some variants, for example, several terms 233, 333 in an interstitial or language specification 230, 330 are each configured to have several terms 233, 333 to have several characters in common with a corresponding legacy-language term 133 so that the local language specification 230, 330 is not a legacy language expression but is human-readable as well as device-executable. Even arcane local language specifications can be satisfied by providing custom code 275 in the local environment that allows an instruction series to be modified and thereby temporarily violate the local language specification 330A during modifications by an authenticated human client 10B. Once the hapless-but-privileged human client 10B finishes an attempted code modification, the custom code 275 can decide whether to restore one or more suitable watermarks 1022 in the locally modified instruction series. This can occur in a context, for example, in which effective human participation in an upgrade would otherwise require falling back to outdated or otherwise untrustworthy heritage-language scripts 181-183.

FIG. 17 depicts an operational flow 1700 in which one or more improved technologies may be incorporated to use and access one or more cloud-based repositories 113A-D for protecting software functionality cost-effectively in containerized computing environments 191, 291, 391, 491, 991 with a vulnerability 119, 219 to unnoticed attacks or other degradation over time. In a scenario as shown, for example, one or more client devices 1100A provide one or more operating parameters 1725 to an open-source builder 1713A (e.g. based on Linux), including one or more indications of conditions under which a local copy or extraction of an upstream repository 83A may download data 1727 according to one or more requests 1726. Such parameters 1725 may indicate a time period 599 within an order of magnitude of an hour or a day, for example, controlling periodic updates to receive data 1727 for periodic uploads 1734 to a local repository 83D, triggering a response 1736 that includes an inventory 1736 thereof including timestamps 579 and other indicia of versioning as described herein. Alternatively or additionally, such synchronization may likewise include a periodic or other occasional implementation 1730 of a local build 578A.

If every designated package 909 is built successfully, a monolithic environment 992A may result for client 1770 so that no unresolved dependencies 907 to the upstream environment 991 need to be preserved and so that one or more language specifications 130 thereof need not be implemented in the destination environment 992A. Otherwise some functionality will either fail to migrate or be delivered in an unimproved form (e.g. as an instance of instruction series 983B that is identical to a corresponding instruction series 983A) so as to create a hybrid destination environment 992B. Until every designated package 909 is built, such as by setting crawlers 971 or other bots 972 to acquire missing digital resources, one or more dependencies 907 (e.g. upon the upstream environment language specification 130 or other build environment artifacts 910B) will remain when one or more functions 117, 217 (e.g. of instruction series 983) are invoked. System 900 illustrates that although a hybrid environment 992B (i.e. one that enables one or more instances of translated packages 909B alongside one or more one or more instances of untranslated packages 909B) is not ideal in some respects, it does allow a client 1770A to remove one or more repositories 113D that would otherwise need to be maintained for access to one or more functions 217 resident in one or more unimproved instruction series 983B. Also a hash function or other result 1738 of the implementation 1730 is recorded in a (blockchain or other) write-only repository 83C and a report of the implementation 1730 or a signature 1746 confirming such recordation (or both) is returned to the client device 1100A as shown.

After a delay 1759 of months or years, client device 1100A provides one or more operating parameters 1775 to the builder 1713A, including one or more indications of conditions under which a local copy or extraction of an upstream repository 83A may download data 1777 according to one or more requests 1776. Such parameters 1775 may indicate complaints, errors, or other events that signify one or more functions 117, 217 that no longer seem to work as they once did. Upon a validation 1780 of the returned data 1780 (e.g. using a public key 595 to confirm a signature thereof), a rebuild 1778 at another facility 1778 is initiated at (a destination environment operated by) another client 1770B, and a confirmation 1789 to this effect is returned to the client device 1100A as shown.

Figure 18:
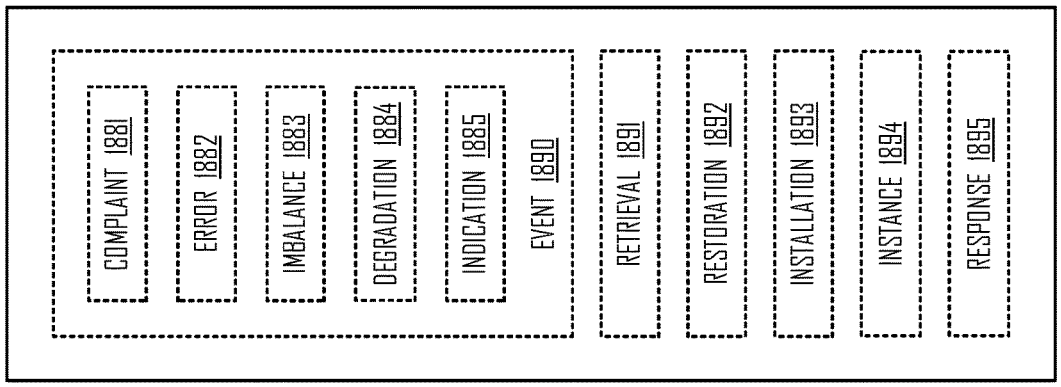
FIG. 18 depicts informational data borne by one or more data-handling media in which one or more improved technologies may be incorporated.

FIG. 18 schematically illustrates one or more memories or other data-handling media 1800 comprising one or more instances of complaints 1881, of exceptions or other errors 1882, of imbalances 1883, of degradations 1884, or of other digitally expressed indications 1885 of an apparent loss of one or more functions 117, 217. In some variants as described herein, one or more such events 1890 may trigger one or more instances 1894 of artifact retrievals 1891, of restorations 1892, or of installations 1893 as further described below.

Figure 19:
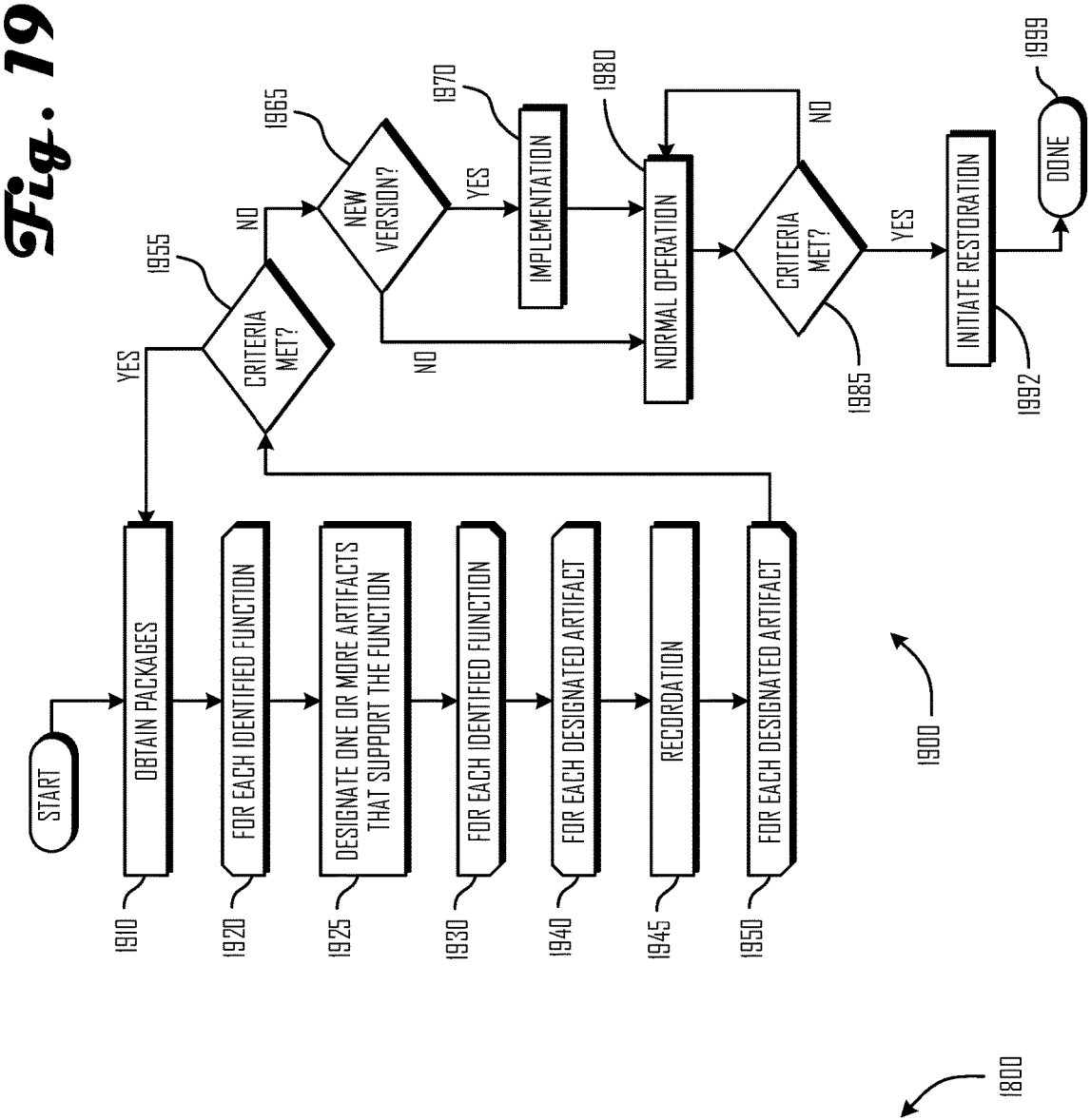
FIG. 19 depicts another flow diagram in which one or more improved technologies may be incorporated.

FIG. 19 illustrates an operational flow 1900 suitable for use with at least one embodiment, such as may be performed on a client device 1100, a server 1200, or a human operator invoking circuitry 1028 that performs these operations (or some combination thereof) using special-purpose circuitry thereof. As will be recognized by those having ordinary skill in the art, not all events of information management are illustrated in FIG. 19. Rather, for clarity, only those steps reasonably relevant to describing the security-enhanced computing interaction aspects of flow 1900 are shown and described. Those having ordinary skill in the art will also recognize the present embodiment is merely one exemplary embodiment and that variations on the present embodiment may be made without departing from the scope of the broader inventive concept set forth in the clauses and claims below. In some contexts, for example, some or all of flow 1900 may be performed automatically by one or more processors 1102, 1202 on an ongoing basis.

Operation 1910 describes obtaining packages (e.g. as shown in FIG. 10 or 14).

Operation 1920 begins an iterative protocol (e.g. performed upon each function 117, 217 corresponding to an obtained package 909).

Operation 1925 designates some artifacts 910 where a package 909 is found that identifies them.

Operation 1930 signals a repetition or conclusion of the iterative protocol performed upon each identified function.

Operation 1940 begins an iterative protocol pertaining to each designated artifact.

Operation 1945 signals a (retrieval 1891 and) recordation, either for immediate implementation or batch process.

Operation 1950 signals a repetition or conclusion of the iterative protocol performed upon each designated artifact.

Operation 1955 signals a branch determination of whether one or more additional packages 909 need processing, returning control to operation 1910 if so. Otherwise control passes to operation 1965. In light of teachings herein. a client 1770, technician, or other user may choose one or more criteria (e.g. thresholds 598) appropriate for operation 1955 without any undue experimentation.

Operation 1965 signals a branch determination of whether a new version exists for any of the designated items, passing control to operation 1970 if so. Otherwise control passes directly to operation 1980.

Operation 1980 signals an implementation (e.g. by performing a compilation, validation, or other such components of a build 578 as described herein).

Operation 1985 signals a branch determination of whether one or more exceptions or other events 1890 need processing, returning control to operation 1980 if not. Otherwise control passes to operation 1992. In light of teachings herein. a client 1770, technician, or other user may choose one or more criteria (e.g. thresholds 598) appropriate for operation 1985 without any undue experimentation.

Operation 1980 signals a restoration 1892 of some or all functions 117, 217 to which the one or more exceptions or other events 1890 pertain, such as by response protocols described herein.

Operation 1999 signals a completion of the operational flow 1900, such as by returning a result to a human or other entity that invoked flow 1900.

Referring again to the figures above, there are shown several operational flows 1300, 1400, 1600, 1900 configured to coordinate or otherwise cause a migration of software 110 in one or more installations 1893 or builds 578 (or both) of a destination environment 992. In some variants one or more instances of parsing modules are invoked so as to extract or otherwise obtain a first version identifier (e.g. alphanumeric version number or version-indicative timestamp 597) associated with a first version 121-123 of one or more instruction series 183-184 of the one or more primary digital resources 651 that implement one or more functions 117 to be protected. This can occur, for example, in a context in which a first artifact 910A of a first computing environment 192 supports the one or more functions 117 but a second artifact 910 does not support the one or more functions 117 and in which a voltage configuration 1051 on an electrical node set 1041 thereof manifests such version identification.

One or more interface modules may be invoked so as to signal or otherwise facilitate a first upload 1734 or other recordation 1945 of the first artifact 910A of the first computing environment 192, 292 that supports the one or more functions 117. This can occur, for example, in a context in which a voltage configuration 1055 on an electrical node set 1045 thereof manifests such artifact(s) 910.

One or more (instances of) configuration modules 1033 are invoked so as to signal or otherwise facilitate a modification of the one or more instruction series 181-185 that alters a particular identifier 568 that refers to the first artifact 910A so that the first artifact 910A of the first computing environment 192, 292 does not support a translation 278 or other second version 221-223 of the one or more instruction series 181-185. This can occur, for example, in a context in which a voltage configuration 1053 on an electrical node set 1043 thereof manifests an address or other reference to a proactively created instance of the first artifact 910A.

One or more processing modules 1037 may be invoked so as to translate the first version 121-123 of the one or more instruction series 183-184 of the one or more primary digital resources 651 that implement the one or more functions 117 in a first device-executable language 125 defined by a first language specification 130 into the second version 221-223 thereof. This can occur, for example, in a context in which a voltage configuration 1057 on an electrical node set 1047 thereof manifests a language specification 230 of a destination environment.

One or more (instances of) parsing modules 1032 are invoked so as to obtain a second version identifier (e.g. a "beta" status 574 or other alphanumeric designation) associated with the second version 221-223 of the one or more instruction series 181-185. This can occur, for example, in a context in which a voltage configuration 1052 on an electrical node set 1042 thereof manifests such version identification.

In some variants one or more other configuration modules 1033 may be invoked so as to trigger, enable, authorize, or otherwise allow the translated second version of the one or more instruction series to execute in the destination environment. This can occur, for example, in a context in which a parser 214 of the destination environment applies the second language specification 230 in lieu of the first language specification 130 and in which a parser 114 of one or more upstream computing environments 191 applies the first language specification 130 in lieu of the second language specification 230 and in which a voltage configuration 1054 on an electrical node set 1044 thereof manifests a private key 596 by which such activity is authorized.

In light of teachings herein, numerous existing techniques may be applied for configuring special-purpose circuitry or other structures effective for securing, monitoring, connecting, analyzing, modeling, translating, recognizing, recording, retrieving, reverting, facilitating, and other operations as described herein without undue experimentation. See, e.g., U.S. patent Ser. No. 10/701,213 ("Dynamically generating an aggregation routine"); U.S. patent Ser. No. 10/416,979 ("Package installation on a host file system using a container"); U.S. patent Ser. No. 10/382,424 ("Secret store for OAuth offline tokens"); U.S. patent Ser. No. 10/360,150 ("Techniques for managing memory in a multiprocessor architecture"); U.S. patent Ser. No. 10/356,155 ("Service onboarding"); U.S. patent Ser. No. 10/339,837 ("Distribution of scrambled binary output using a randomized compiler"); U.S. patent Ser. No. 10/142,453 ("User interface for a computing device"); U.S. patent Ser. No. 10/127,160 ("Methods and systems for binary scrambling"); U.S. patent Ser. No. 10/050,797 ("Inserting snapshot code into an application"); U.S. patent Ser. No. 10/033,604 ("Providing compliance/monitoring service based on content of a service controller"); U.S. Pat. No. 9,923,793 ("Client-side measurement of user experience quality"); U.S. Pat. No. 9,807,077 ("Systems and methods for containerized data security"); U.S. Pat. No. 9,665,474 ("Relationships derived from trace data"); U.S. Pat. No. 9,558,362 ("Data encryption using an external arguments encryption algorithm"); U.S. Pat. No. 9,483,590 ("User-defined application models"); U.S. Pat. No. 9,465,721 ("Snapshotting executing code with a modifiable snapshot definition"); U.S. Pat. No. 9,417,859 ("Purity analysis using white list/black list analysis"); U.S. Pat. No. 9,389,992 ("Multiple tracer configurations applied on a function-by-function level"); U.S. Pat. No. 9,292,415 ("Module specific tracing in a shared module environment"); U.S. Pat. No. 9,286,042 ("Control flow graph application configuration"); U.S. Pat. No. 9,141,502 ("Method and system for providing high availability to computer applications"); U.S. Pat. No. 9,021,445 ("Tracer list for automatically controlling tracer behavior"); U.S. Pat. No. 8,978,016 ("Error list and bug report analysis for configuring an application tracer"); U.S. Pat. No. 8,966,462 ("Memory management parameters derived from system modeling"); U.S. Pat. No. 8,909,546 ("Privacy-centric ad models that leverage social graphs"); U.S. Pat. No. 8,849,968 ("Secure and stable hosting of third-party extensions to web services"); U.S. Pat. No. 8,775,437 ("Dynamic reranking of search results based upon source authority"); U.S. Pat. No. 8,694,574 ("Optimized settings in a configuration database with boundaries"); U.S. Pat. No. 8,656,378 ("Memorization configuration file consumed at compile time"); U.S. Pat. No. 8,656,135 ("Optimized memory configuration deployed prior to execution"); U.S. Pat. No. 8,650,538 ("Meta garbage collection for functional code"); U.S. Pat. No. 8,595,743 ("Network aware process scheduling"); U.S. Pat. No. 8,312,273 ("Privacy vault for maintaining the privacy of user profiles"); U.S. Pat. No. 8,014,308 ("Hardware architecture for cloud services"); and U.S. Pat. Pub. No. 20140274078 ("Protocols for facilitating broader access in wireless communications").

Referring again to the figures above, there are shown several variant systems 300, 400, 700, 900 and contexts in which one or more functions 117, 217 are preserved or re-deployed notwithstanding their prior dependencies 907 upon externally controlled digital resources 653-655, 753-755 natively available on the Internet or other networks 1050. In some contexts one or more parsing modules 1031 may be configured to receive or generate an alphanumeric version number or date-indicative timestamp 597 as a version identifier like those of FIG. 5. Such identifiers may formally or otherwise identify one or more operating systems 577 or other instruction series as "primary" digital resources 651, 751 having an "early" version 123 that invokes one or more corresponding secondary digital resources 653, 753 having an "early" version 123 and thereby creates a dependency 907 by which a partial or total obsolescence may be created (e.g. in a later state 2027, 2028).

In some variants a recognition module 1034 and aggregation module 1226 may be configured jointly to detect one or more software updates or other indicia of new revision and to take appropriate action long before digital resources become obsolete. For example such circuitry may be configured to make replicated or other recordations 1945 in one or more repositories 83, 683 of respective resource versions 123, 223 before and after each apparent revision, and to annotate such recordations with one or more timestamps 597 that signal when the (apparent) revision occurred irrespective of whether any substantive particulars about the resource change are available. With daily or weekly hash function comparisons or other suitably probative event detection, even surreptitious software versioning can be detected soon enough to allow for a meaningful rollback protocol as described herein.

In some variants an interface module 1035 may be configured to cause a first recordation 1945 of various digital resources on a sufficiently selective basis to preserve most or all recently-used resources 651, 653-655, 751, 753-755 (e.g. implementing a suitable recency threshold 598 on the order of days or weeks prior) in a target environment 191-192, 692, 992, 1592 with a frequency on the order of a few hours or a few days even while excluding a majority of digital resources 652 (e.g. as measured in aggregate resource count or aggregate resource size).

In some variants a parsing module 1032 may be configured to identify a second version 223 of (at least one of) the one or more corresponding secondary digital resources 653, 753 to supersede a first version 123 of the one or more corresponding secondary digital resources 653, 753 whereby (at least some of) the a version 123 of (at least one of) the one or more corresponding secondary digital resources 653, 753 becomes (at least partly) obsolete in the first environment 191-192, 692, 992, 1592. Alternatively or additionally, one or more one or more component configuration modules 1033 thereof may be configured to cause a modification of one or more instruction series 183-184 of the one or more primary digital resources 651 so as to alter a particular identifier 568 thereof that refers to a first artifact 910A of the one or more secondary digital resources 653, 753 so that the first artifact 910A does not support a (translation 278 of or other) second version 223 of the one or more instruction series 183-184 thereafter.

In some variants another instance of an interface module 1035 is configured to signal a selective recordation 1945 of a first artifact 910A of the first computing environment 192, 292 that supports the one or more functions 117, 217 as the first recordation. This can occur, for example, in a context in which the first artifact 910A includes the first version 123 of the one or more corresponding secondary digital resources 653, 753.

In some variants another instance of an interface module 1036 may be configured to retrieve a (translation or copy or other instance of) the first version 123 of the one or more corresponding secondary digital resources 653, 753 so as to support (at least one of) the one or more primary digital resources 651 with the first version 123 of the one or more corresponding secondary digital resources 653, 753 in lieu the second version 223 of the one or more corresponding secondary digital resources 653, 753. In some variants a builder 613D may implement a second environment 692D as an automatic and conditional response 1895 to a functional (breakdown or other apparent) degradation 1884 of (at least one of) a primary digital resource 651. In some variants such an environment 692D may implement a safer version of a client-requested outdated environment, for example, partly based upon a user-selected date and partly based on an array of date-indicative and version-indicative timestamps 597 so as to exclude any remnant of resources that are "too new" (e.g. relative to a time period 599 that implements the user-selected date).

In some variants another instance of a processing modules 1037 may be configured to translate or otherwise migrate a first version 123 of one or more instruction series 184 of the one or more primary digital resources 651 that implement one or more functions 117, 217 in a first device-executable language 125 defined by a first language specification 130 into a second version 223 of the one or more instruction series 184 of the one or more primary digital resources 651 that implement the one or more functions 117, 217 in a second device-executable language 225 defined by a second language specification 230. This can occur, for example, in a context in which the second version 223 of the one or more instruction series 184 is noncompliant with the first language specification 130 as applied by a first parser 114 and in which the first version 123 of the one or more instruction series 184 is noncompliant with the second language specification 230 as applied by a second parser 214.

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A computing method (e.g., comprising one or more data flows 1700 or operational flows 1600, 1900 described above) for protecting one or more functions 117, 217 in a first computing environment 191-192, 692, 992, 1592, comprising:

invoking transistor-based circuitry (e.g. one or more parsing modules 1031 receiving or generating an alphanumeric version number or date-indicative timestamp 597 as a version identifier like those of FIG. 5) configured to identify one or more (operating systems 577, application instruction series 184, 984 or other) primary digital resources 651 (e.g. packages containing functions 117, 217 implemented in device-executable code 975) and a first version 123 of one or more corresponding secondary digital resources 653, 753 (e.g. wherein such a dependency 907 may include one or more native or replicated artifacts 910 that such functions 117, 217 can invoke) upon which the one or more primary digital resources 651 are dependent in the first environment 191-192, 692, 992, 1592; and invoking transistor-based circuitry (e.g. one or more interface modules 1035) configured to cause a first recordation 1945 of the first version 123 of the one or more corresponding secondary digital resources 653, 753 that is selective insofar that one or more other digital resources 652 of the first environment 191-192, 692, 992, 1592 are excluded from the first recordation 1945.

2. The computing method of any of the above Clauses comprising:

invoking transistor-based circuitry (e.g. one or more parsing modules 1032) configured to identify a second version 223 of (at least one of) the one or more corresponding secondary digital resources 653, 753 to supersede the first version 123 of the one or more corresponding secondary digital resources 653, 753.

3. The computing method of any of the above Clauses comprising:

invoking transistor-based circuitry (e.g. one or more interface modules 1036) configured to retrieve a (translation or copy or other instance of) the first version 123 of the one or more corresponding secondary digital resources 653, 753 so as to support (at least one of) the one or more primary digital resources 651 with the first version 123 of the one or more corresponding secondary digital resources 653, 753 so as to supersede the second version 223 of the one or more corresponding secondary digital resources 653, 753.

4. The computing method of any of the above Clauses comprising:

invoking transistor-based circuitry (e.g. one or more instances of interface modules 1036) configured to retrieve a (translation or copy or other instance of) the first version 123 of the one or more corresponding secondary digital resources 653, 753 so as to support (at least one of) the one or more primary digital resources 651 with the first version 123 of the one or more corresponding secondary digital resources 653, 753 in lieu of the second version 223 of the one or more corresponding secondary digital resources 653, 753.

5. The computing method of any of the above Clauses comprising:

invoking transistor-based circuitry (e.g. one or more interface modules 1036) configured to retrieve a (translation or copy or other instance of) the first version 123 of the one or more corresponding secondary digital resources 653, 753 so as to support (at least one of) the one or more primary digital resources 651 with the first version 123 of the one or more corresponding secondary digital resources 653, 753 in a second environment 692, 992, 1592.

6. The computing method of any of the above Clauses comprising:

after a functional degradation 1884 of (at least one of) the one or more primary digital resources 651, invoking transistor-based circuitry (e.g. one or more interface modules 1036) configured to retrieve a (translation or copy or other instance of) the first version 123 of the one or more corresponding secondary digital resources 653, 753 so as to support (at least one of) the one or more primary digital resources 651 with the first version 123 of the one or more corresponding secondary digital resources 653, 753.

7. The computing method of any of the above Clauses comprising:

in response to a functional degradation 1884 of (at least one of) the one or more primary digital resources 651, invoking transistor-based circuitry (e.g. one or more interface modules 1036) configured to retrieve a (translation or copy or other instance of) the first version 123 of the one or more corresponding secondary digital resources 653, 753 so as to support (at least one of) the one or more primary digital resources 651 with the first version 123 of the one or more corresponding secondary digital resources 653, 753.

8. The computing method of any of the above Clauses comprising:

invoking transistor-based circuitry (e.g. one or more interface modules 1035) configured to cause a first recordation 1945 of digital resources selectively enough to preserve more than half of all recently-used resources 651, 653-655, 751, 753-755 in the first computing environment 191-192, 692, 992, 1592 with a frequency within an order of magnitude of 1 hour even while excluding a majority of digital resources 652 by aggregate resource count.

9. The computing method of any of the above Clauses comprising:

invoking transistor-based circuitry (e.g. one or more instances of interface modules 1035) configured to cause a first recordation 1945 of digital resources selectively enough to preserve more than half of all recently-used resources 651, 653-655, 751, 753-755 in the first computing environment 191-192, 692, 992, 1592 with a frequency within an order of magnitude of 1 hour even while excluding a majority of digital resources 652 by aggregate resource size.

10. The computing method of any of the above Clauses comprising:

invoking transistor-based circuitry (e.g. one or more interface modules 1035) configured to cause a first recordation 1945 of digital resources selectively enough to preserve more than half of all recently-used resources 651, 653-655, 751, 753-755 in the first computing environment 191-192, 692, 992, 1592 with a frequency within an order of magnitude of 1 day even while excluding a majority of digital resources 652 by aggregate resource count.

11. The computing method of any of the above Clauses comprising:

invoking transistor-based circuitry configured to cause a first recordation 1945 of digital resources selectively enough to preserve more than half of all recently-used resources 651, 653-655, 751, 753-755 in the first computing environment 191-192, 692, 992, 1592 with a frequency within an order of magnitude of 1 day even while excluding a majority of digital resources 652 by aggregate resource size.

12. The computing method of any of the above Clauses comprising:

facilitating a selective recordation 1945 of an artifact 910A of the first computing environment 191-192, 692, 992, 1592 that supports the one or more functions 117, 217 by 13. The computing method of any of the above Clauses comprising:

invoking transistor-based circuitry configured to facilitate a modification comprises defining a modification.

14. The computing method of any of the above Clauses comprising:

facilitating a modification comprises suggesting or otherwise signaling a modification.

15. The computing method of any of the above Clauses comprising:

facilitating a modification comprises enabling a modification.

16. The computing method of any of the above Clauses comprising:

facilitating a modification comprises triggering a modification.

17. The computing method of any of the above Clauses comprising:

translating the first version 123 of the one or more instruction series 183-185 into a second version 223 of the one or more instruction series 183-185.

18. The computing method of any of the above Clauses wherein the invoking transistor-based circuitry configured to facilitate a modification comprises causing a modification.

19. The computing method of any of the above Clauses wherein the invoking transistor-based circuitry configured to facilitate a modification comprises implementing a translation 278 that implements a modification.

20. The computing method of any of the above Clauses wherein the invoking transistor-based circuitry configured to facilitate a modification comprises obtaining a software patch 920 that implements a modification.

21. The computing method of any of the above Clauses wherein the invoking transistor-based circuitry configured to facilitate a modification comprises implementing a rebuild 1778 that implements a modification.

22. The computing method of any of the above Clauses comprising:

invoking transistor-based circuitry (e.g. a variant of interface module 1035) configured to signal or otherwise facilitate a first upload 1734 or other recordation 1945 of a first artifact 910A of the first computing environment 192, 292 that supports the one or more functions 117, 217.

23. The computing method of any of the above Clauses comprising:

invoking transistor-based circuitry (e.g. an instance of interface module 1035) configured to signal or otherwise facilitate a first upload 1734 or other recordation 1945 of a first artifact 910A of the first computing environment 192, 292 that supports the one or more functions 117, 217; and invoking transistor-based circuitry (e.g. an instance of configuration module 1033) configured to facilitate a modification of the one or more instruction series 183-185 that alters a particular identifier 568 that refers to the first artifact 910A so that the first artifact 910A of the first computing environment 192, 292 does not support a (translation 278 or other) second version 223 of the one or more instruction series 183-185.

24. The computing method of any of the above Clauses comprising:

invoking transistor-based circuitry (e.g. an instance of interface module 1035) configured to signal or otherwise facilitate a first upload 1734 or other recordation 1945 of a first artifact 910A of the first computing environment 192, 292 that supports the one or more functions 117, 217;

invoking transistor-based circuitry (e.g. one or more configuration modules 1033) configured to facilitate a modification of the one or more instruction series 183-185 that alters a particular identifier 568 that refers to the first artifact 910A so that the first artifact 910A of the first computing environment 192, 292 does not support a (translation 278 or other) second version 223 of the one or more instruction series 183-185; and invoking transistor-based circuitry (e.g. an instance of parsing module 1032) configured to obtain a second version identifier associated with the second version 223 of the one or more instruction series 181-185.

25. The computing method of any of the above Clauses wherein the invoking the transistor-based circuitry configured to cause the selective first recordation 1945 of the first version 123 of the one or more corresponding secondary digital resources 653, 753 comprises:

invoking transistor-based circuitry configured to cause a write-only first (upload 1734 or other) recordation 1945 of the first version 123 of the one or more instruction series 183-184 of the one or more primary digital resources 651 that implement the one or more functions 117, 217 in the first device-executable language 125, 225 defined by the first language specification 130, 230 (e.g. into one or more write-only repositories).

26. The computing method of any of the above Clauses wherein a modification of one or more instruction series 183-185 thereof (exists and) comprises a spawn or other rebuild 1778.

27. The computing method of any of the above Clauses wherein a modification of the one or more instruction series 182-184 (exists and) comprises a translation 278.

28. The computing method of any of the above Clauses comprising:

invoking transistor-based circuitry (e.g. one or more processing modules 1037) configured to translate a first version 123 of one or more instruction series 184 of the one or more primary digital resources 651 that implement one or more functions 117, 217 in a first device-executable language 125 defined by a first language specification 130 into a second version 223 of the one or more instruction series of the one or more primary digital resources 651 that implement the one or more functions 117, 217 in a second device-executable language 225 defined by a second language specification 230, wherein the second version 223 of the one or more instruction series is noncompliant with the first language specification 130 as applied by a first parser 114 and wherein the first version 123 of the one or more instruction series is noncompliant with the second language specification 230 as applied by a second parser 214.

29. The computing method of any of the above Clauses wherein numerous other digital resources 652 of the first environment 191-192, 692, 992, 1592 are excluded from the first recordation 1945 and wherein the numerous other digital resources 652 include the one or more other digital resources 652.

30. The computing method of any of the above Clauses wherein the first version is identified by a version-indicative timestamp 597.

31. The computing method of any of the above Clauses wherein the first version is identified by a date-indicative and version-indicative timestamp 597.

32. The computing method of any of the above Clauses wherein the first version is identified by a builder version identifier 513.

33. The computing method of any of the above Clauses wherein the first version is identified by a parser version identifier 514.

34. The computing method of any of the above Clauses wherein the first version is identified by an interpreter version identifier 515.

35. The computing method of any of the above Clauses wherein the first version is identified by a (just-in-time or other) compiler version identifier 516.

36. The computing method of any of the above Clauses wherein the first version is identified by a function version identifier 517.

37. The computing method of any of the above Clauses wherein the first version is identified by a (scrambler or other) translator version identifier 518.

38. The computing method of any of the above Clauses wherein the first version is identified by a semantic version identifier 519.

39. The computing method of any of the above Clauses wherein the first version is identified by a service version identifier 520.

40. The computing method of any of the above Clauses wherein the first version is identified by a digital resource content identifier 521-523.

41. The computing method of any of the above Clauses wherein the first version is identified by a language version identifier 525.

42. The computing method of any of the above Clauses wherein the first version is identified by an internal version identifier 563.

43. The computing method of any of the above Clauses wherein the first version is identified by a release version identifier 924.

44. The computing method of any of the above Clauses wherein the first version is identified by a first (instance of a) date-indicative timestamp 597 and wherein a second version is identified by a subsequent second date-indicative timestamp 597.

45. The computing method of any of the above Clauses performed so as to include most or all operations of flow 1300 of FIG. 13.

46. The computing method of any of the above Clauses performed so as to include most or all operations of flow 1400 of FIG. 14.

47. The computing method of any of the above Clauses performed so as to include most or all operations of flow 1600 of FIG. 16.

48. The computing method of any of the above Clauses performed so as to include most or all components of data flow 1700 of FIG. 17.

49. The computing method of any of the above Clauses performed so as to include most or all operations of flow 1900 of FIG. 19.

50. The computing method of any of the above Clauses comprising:

invoking one or more modules 1031-1038 of transistor-based circuitry 1028 that enable a modification of one or more instruction series 183-185.

51. The computing method of any of the above Clauses comprising:

altering a memory address 968 as a component of a particular identifier 568.

52. The computing method of any of the above Clauses comprising:

altering a universal record locator 567 as a component of a particular identifier 568.

53. The computing method of any of the above Clauses comprising:

altering a pointer as a component of a particular identifier 568.

54. The computing method of any of the above Clauses comprising:

altering an index file 529 as a component of a particular identifier 568.

55. The computing method of any of the above Clauses comprising:

invoking transistor-based circuitry configured to signal or otherwise facilitate a restoration 1892 of a first version 123 of one or more instruction series 183-184 of one or more primary digital resources 651 that implement one or more functions 117, 217.

56. The computing method of any of the above Clauses comprising:

invoking transistor-based circuitry configured to facilitate a restoration 1892 of a first version 123 of one or more instruction series 183-184 of one or more primary digital resources 651 that implement one or more functions 117, 217 wherein a restoration 1892 includes a retrieval 1891 of a first artifact 910A and an installation 1893 of a replacement instance 1894 of a first artifact 910 in a first computing environment 192, 292.

57. The computing method of any of the above Clauses comprising:

invoking transistor-based circuitry configured to (signal or otherwise) facilitate a restoration 1892 of a first version 123 of one or more instruction series 183-184 of one or more primary digital resources 651 that implement one or more functions 117, 217 as an automatic and conditional response 1895 to a detected event 1890.

58. The computing method of any of the above Clauses comprising:

invoking transistor-based circuitry configured to facilitate a restoration 1892 of a first version 123 of one or more instruction series 183-184 of one or more primary digital resources 651 that implement one or more functions 117, 217 wherein a restoration 1892 includes a retrieval 1891 of a first artifact 910A and an installation 1893 of (a replacement instance 1894 or supplemental instance 1894 of) a first artifact 910 in a first computing environment 192, 292 into another computing environment 992A-B.

59. The computing method of any of the above Clauses comprising:
obtaining an implementation 1730 of one or more functions 117, 217 as one or more instruction series 183-185 expressed in a first device-executable language 125, 225 defined by a first language specification 130, 230 in a first computing environment 192, 292.

60. The computing method of any of the above Clauses wherein a modification of one or more instruction series 183-185 comprises a spawn or other rebuild 1778.

61. The computing method of any of the above Clauses wherein a first version identifier comprises a version-indicative timestamp 597.

62. The computing method of any of the above Clauses wherein a first version identifier comprises a first (instance of a) date-indicative timestamp 597 and wherein a second version identifier comprises a subsequent second date-indicative timestamp 597.

63. (Independent) A computing system 300, 400, 600, 700, 800, 900, 1000 for protecting one or more functions 117, 217 in a first computing environment 191-192, 692, 992, 1592, the system comprising:
transistor-based circuitry (e.g. one or more parsing modules 1031 receiving or generating an alphanumeric version number or date-indicative timestamp 597 as a version identifier like those of FIG. 5) configured to identify one or more (operating systems 577, application instruction series 184, 984 or other) primary digital resources 651 (e.g. packages containing functions 117, 217 implemented in device-executable code 975) and a first version 123 of one or more corresponding secondary digital resources 653, 753 (e.g. wherein such a dependency 907 may include one or more native or replicated artifacts 910 that such functions 117, 217 can invoke) upon which the one or more primary digital resources 651 are dependent in the first environment 191-192, 692, 992, 1592; and
transistor-based circuitry (e.g. one or more interface modules 1035) configured to cause a first recordation 1945 of the first version 123 of the one or more corresponding secondary digital resources 653, 753 that is selective insofar that one or more other digital resources 652 of the first environment 191-192, 692, 992, 1592 are excluded from the first recordation 1945.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A computing method for protecting one or more functions in a first computing environment, comprising:
invoking transistor-based circuitry configured to identify one or more primary digital resources including an operating system and a first version of one or more corresponding secondary digital resources upon which said one or more primary digital resources are dependent in said first environment;
invoking transistor-based circuitry configured to cause a first recordation of said one or more primary digital resources and said first version of said one or more corresponding secondary digital resources that is selective insofar that numerous other digital resources of said first environment are excluded from any such recordation;
invoking transistor-based circuitry configured to identify a second version of said one or more corresponding secondary digital resources to supersede said first version of said one or more corresponding secondary digital resources whereby said first version of said one or more corresponding secondary digital resources becomes obsolete; and
as an automatic and conditional response to a functional degradation of said one or more primary digital resources, invoking transistor-based circuitry configured to retrieve and install said first version of said one or more corresponding secondary digital resources so as to support said one or more primary digital resources again with said first version of said one or more corresponding secondary digital resources so as to supersede said second version of said one or more corresponding secondary digital resources.

2. The computing method of claim 1 comprising:
invoking transistor-based circuitry configured to cause a first recordation of digital resources selectively enough to preserve more than half of all recently-used resources in said first computing environment with a frequency within an order of magnitude of 1 day even while excluding a majority of digital resources by aggregate resource size.

3. The computing method of claim 1 comprising:
invoking transistor-based circuitry configured to signal a selective recordation of a first artifact of said first computing environment that supports said one or more functions as said first recordation, wherein said first artifact includes said one or more primary digital resources and said first version of said one or more corresponding secondary digital resources.

4. The computing method of claim 1 comprising:
invoking transistor-based circuitry configured to translate a first version of one or more instruction series of said one or more primary digital resources that implement one or more functions in a first device-executable language defined by a first language specification into a second version of said one or more instruction series of said one or more primary digital resources that implement said one or more functions in a second device-executable language defined by a second language specification, wherein said second version of said one or more instruction series is noncompliant with said first language specification as applied by a first parser and wherein said first version of said one or more instruction series is noncompliant with said second language specification as applied by a second parser.

5. The computing method of claim 1 wherein said invoking transistor-based circuitry configured to identify a second version of said one or more corresponding secondary digital resources to supersede said first version of said one or more corresponding secondary digital resources comprises:
invoking transistor-based circuitry causing a modification of one or more instruction series of said one or more primary digital resources so as to alter a particular identifier thereof that refers to a first artifact of said one or more secondary digital resources so that said first artifact does not support a translated second version of said one or more instruction series.

6. The computing method of claim 1 wherein said first version identifier comprises a date-indicative and version-indicative timestamp and wherein said invoking said transistor-based circuitry configured to cause said selective first recordation of said first version of said one or more corresponding secondary digital resources comprises:
  invoking transistor-based circuitry configured to cause a write-only first recordation of said first version of said one or more instruction series of said one or more primary digital resources that implement said one or more functions in said first device-executable language defined by said first language specification.

7. A computing method for protecting one or more functions in a first computing environment, comprising:
  invoking transistor-based circuitry configured to identify one or more primary digital resources and a first version of one or more corresponding secondary digital resources upon which said one or more primary digital resources are dependent in said first environment;
  invoking transistor-based circuitry configured to cause a first recordation of said first version of said one or more corresponding secondary digital resources that is selective insofar that one or more other digital resources of said first environment are excluded from said first recordation;
  invoking transistor-based circuitry configured to identify a second version of said one or more corresponding secondary digital resources to supersede said first version of said one or more corresponding secondary digital resources; and
  as an automatic and conditional response to a functional degradation invoking transistor-based circuitry configured to retrieve and install said first version of said one or more corresponding secondary digital resources so as to support said one or more primary digital resources again with said first version of said one or more corresponding secondary digital resources.

8. The computing method of claim 7 comprising:
  in response to a functional breakdown of at least one of said one or more primary digital resources, invoking transistor-based circuitry configured to retrieve a said first version of said one or more corresponding secondary digital resources so as to support said one or more primary digital resources with said first version of said one or more corresponding secondary digital resources so as to supersede said second version of said one or more corresponding secondary digital resources.

9. The computing method of claim 7 comprising:
  after a functional breakdown of said one or more primary digital resources invoking transistor-based circuitry configured to retrieve a said first version of said one or more corresponding secondary digital resources so as to support said one or more primary digital resources with said first version of said one or more corresponding secondary digital resources in a second environment as an automatic and conditional response to said functional breakdown of said one or more primary digital resources.

10. The computing method of claim 7 comprising:
  configuring a particular artifact to support said second version of said one or more instruction series so that a prior artifact of said first computing environment thereafter no longer supports said second version of said one or more instruction series.

11. The computing method of claim 7 comprising:
  invoking transistor-based circuitry configured to cause a first recordation of digital resources selectively enough to preserve more than half of all recently-used resources in said first computing environment with a frequency within 1-2 orders of magnitude of 1 hour even while excluding a majority of digital resources by aggregate resource count.

12. The computing method of claim 7 wherein said invoking transistor-based circuitry configured to facilitate said modification comprises:
  invoking transistor-based circuitry configured to translate said first version of said one or more instruction series of said one or more primary digital resources that implement said one or more functions in a first device-executable language defined by a first language specification into said second version of said one or more instruction series of said one or more primary digital resources that implement said one or more functions in a second device-executable language defined by a second language specification wherein said second version of said one or more instruction series is non-compliant with said first language specification as applied by a first interpreter and wherein said first version of said one or more instruction series is non-compliant with said second language specification as applied by a second interpreter.

13. The computing method of claim 7 comprising:
  signaling a determination that said functional degradation of said one or more primary digital resources is not also exhibited in said second environment with said primary digital resources configured to depend on a reconstructed instance of said first version of said one or more corresponding secondary digital resources.

14. The computing method of claim 7 wherein said invoking said transistor-based circuitry configured to cause said selective first recordation of said first version of said one or more corresponding secondary digital resources comprises:
  invoking transistor-based circuitry configured to cause a write-only first recordation of said first version of said one or more instruction series of said one or more primary digital resources that implement said one or more functions in said first device-executable language defined by said first language specification.

15. The computing method of claim 7 comprising:
  invoking transistor-based circuitry configured to signal a selective recordation of a first artifact of said first computing environment that supports said one or more functions as said first recordation, wherein said first artifact includes said first version of said one or more corresponding secondary digital resources.

16. The computing method of claim 7 comprising:
  invoking transistor-based circuitry configured to signal a selective recordation of a first artifact of said first computing environment that supports said one or more functions as said first recordation, wherein said first artifact includes said one or more primary digital resources and said first version of said one or more corresponding secondary digital resources.

17. The computing method of claim 7 comprising:
  invoking transistor-based circuitry configured to facilitate a selective recordation of a first artifact of said first computing environment that supports said one or more functions as said first recordation, wherein said first artifact includes said one or more primary digital resources and said first version of said one or more corresponding secondary digital resources.

18. A computing system for protecting one or more functions in a first computing environment, comprising:
- transistor-based circuitry configured to identify one or more primary digital resources and a first version of one or more corresponding secondary digital resources upon which said one or more primary digital resources are dependent in said first environment;
- transistor-based circuitry configured to cause a first recordation of said first version of said one or more corresponding secondary digital resources that is selective insofar that one or more other digital resources of said first environment are excluded from said first recordation;
- transistor-based circuitry configured to identify a second version of said one or more corresponding secondary digital resources to supersede said first version of said one or more corresponding secondary digital resources; and
- transistor-based circuitry configured to retrieve and install said first version of said one or more corresponding secondary digital resources so as to support said one or more primary digital resources again with said first version of said one or more corresponding secondary digital resources as an automatic and conditional response to a functional degradation.

19. The computing system of claim 18 wherein said transistor-based circuitry configured to identify said second version of said one or more corresponding secondary digital resources to supersede said first version of said one or more corresponding secondary digital resources comprises:
- transistor-based circuitry causing a modification of one or more instruction series of said one or more primary digital resources so as to alter a particular identifier thereof that refers to a first artifact of said one or more secondary digital resources so that said first artifact does not support a second version of said one or more instruction series.

* * * * *